United States Patent
Yonezawa et al.

(10) Patent No.: US 8,103,127 B2
(45) Date of Patent: Jan. 24, 2012

(54) IMAGE PROCESSING METHOD AND IMAGE PROCESSING APPARATUS OF CALCULATING POSITION AND ORIENTATION OF TARGET OBJECTS LOCATED IN IMAGE

(75) Inventors: Hiroki Yonezawa, Yokohama (JP); Kenji Morita, Yokohama (JP); Akihiro Katayama, Yokohama (JP); Rika Takemoto, Kawasaki (JP); Kiyohide Satoh, Kawasaki (JP); Toshihiro Kobayashi, Kawasaki (JP); Sonoko Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 960 days.

(21) Appl. No.: 11/833,396

(22) Filed: Aug. 3, 2007

(65) Prior Publication Data
US 2008/0037901 A1    Feb. 14, 2008

(30) Foreign Application Priority Data

Aug. 11, 2006  (JP) ................................. 2006-220638
Feb. 19, 2007  (JP) ................................. 2007-038430

(51) Int. Cl.
G06K 9/46    (2006.01)
G06F 15/00   (2006.01)
(52) U.S. Cl. .......................... 382/291; 382/276; 358/1.5
(58) Field of Classification Search .................. 382/276, 382/291; 358/1.5
See application file for complete search history.

(56) References Cited

U.S. PATENT DOCUMENTS

| | | | | |
|---|---|---|---|---|
| 6,529,613 | B1 * | 3/2003 | Astle | 382/103 |
| 6,839,466 | B2 * | 1/2005 | Venable | 382/199 |
| 7,016,539 | B1 * | 3/2006 | Silver et al. | 382/216 |
| 7,460,730 | B2 * | 12/2008 | Pal et al. | 382/284 |
| 7,505,048 | B2 * | 3/2009 | Su | 345/629 |

FOREIGN PATENT DOCUMENTS

| | | |
|---|---|---|
| JP | 2002-090118 A | 3/2002 |
| JP | 2005-147894 A | 6/2005 |

OTHER PUBLICATIONS

Beier et al. "Marker-less Vision Based Tracking for Mobile Augmented Reality" The Second IEEE and ACM International Symposium on Mixed and Augmented Reality, 2003, pp. 258-259.*

D. Kotake, S. Uchiyama, and H. Yamamoto, "A marker calibration method utilizing a priori knowledge on marker arrangement," Proc. Third IEEE and ACM International Symposium on Mixed and Augmented Reality (ISMAR'04), pp. 89-98, Nov. 2004.

Iryna Skrypnyk and David G. Lowe: "Scene Modelling, Recognition and Tracking with Invariant Image Features", Proc. Third IEEE and ACM International Symposium on Mixed and Augmented reality, pp. 110-119, 2004.

The above references were cited in a Nov. 18, 2011 Japanese Office Action, a copy of which is enclosed without an English Translation, that issued in Japanese Patent Application No. 2007-038430.

* cited by examiner

Primary Examiner — Stephen Koziol

(74) Attorney, Agent, or Firm — Cowan, Liebowitz & Latman, P.C.

(57) ABSTRACT

Indices in an image of a physical space on which a plurality of indices are allocated are identified, and the positions and orientations, on the physical space, of all or some identified indices are calculated.

10 Claims, 38 Drawing Sheets

FIG. 1

| blk1 | c1 | c2 | blk2 |
|------|----|----|------|
| x1   | x2 | x3 | x4   |
| x5   | x6 | x7 | x8   |
| wht  | c3 | c4 | blk3 |

F I G. 2
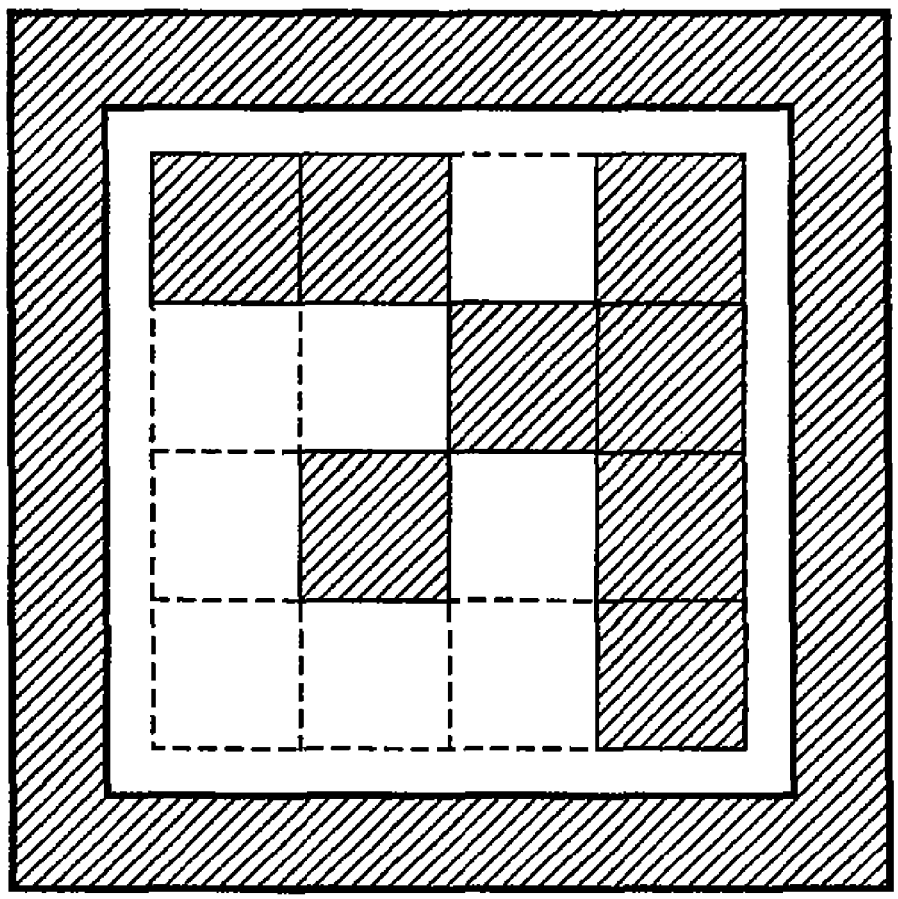

FIG. 5

| ID | MARKER STATE | | | | SIZE | POSITION | ORIENTATION |
|---|---|---|---|---|---|---|---|
| | REFERENCE MARKER FLAG | DETECTION FLAG | TARGET FLAG | COMPLETION STATUS | | | |
| 1 | 0 | 1 | 1 | 2 | 40 | (0, 0, 0) | (0, 0, 0)0 |
| 7 | 1 | 1 | 1 | 1 | 40 | (10, −400, 200) | (0, 0, −1)90 |
| 45 | 0 | 1 | 1 | 1 | 40 | (20, 600, −200) | (0, 1, 0)0 |
| 125 | 0 | 1 | 0 | 0 | 40 | (500, 0, 800) | (0, 1, 0)0 |
| | | | | | | | |
| | | | | | | | |

F I G. 8
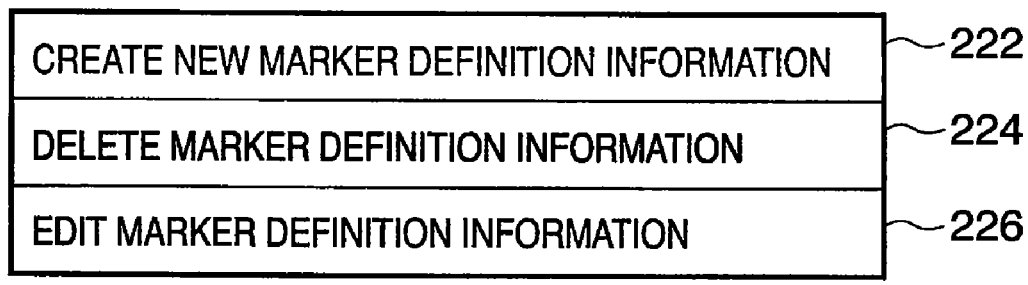

FIG. 15

| ID | MARKER STATE ||||||| SIZE | POSITION | ORIENTATION |
|---|---|---|---|---|---|---|---|---|---|---|
| | REFERENCE MARKER FLAG | DETECTION FLAG | TARGET FLAG | EXCLUSION FLAG | COMPLETION STATUS ||||||
| 1 | 0 | 1 | 1 | 0 | 2 | | 40 | (0, 0, 0) | (0, 0, 0)0 |
| 7 | 1 | 1 | 1 | 0 | 1 | | 40 | (10, −400, 200) | (0, 0, −1)90 |
| 45 | 0 | 1 | 1 | 1 | 1 | | 40 | (20, 600, −200) | (0, 1, 0)0 |
| 125 | 0 | 1 | 0 | 0 | 0 | | 40 | (500, 0, 800) | (0, 1, 0)0 |
| | | | | | | | | | |
| | | | | | | | | | |

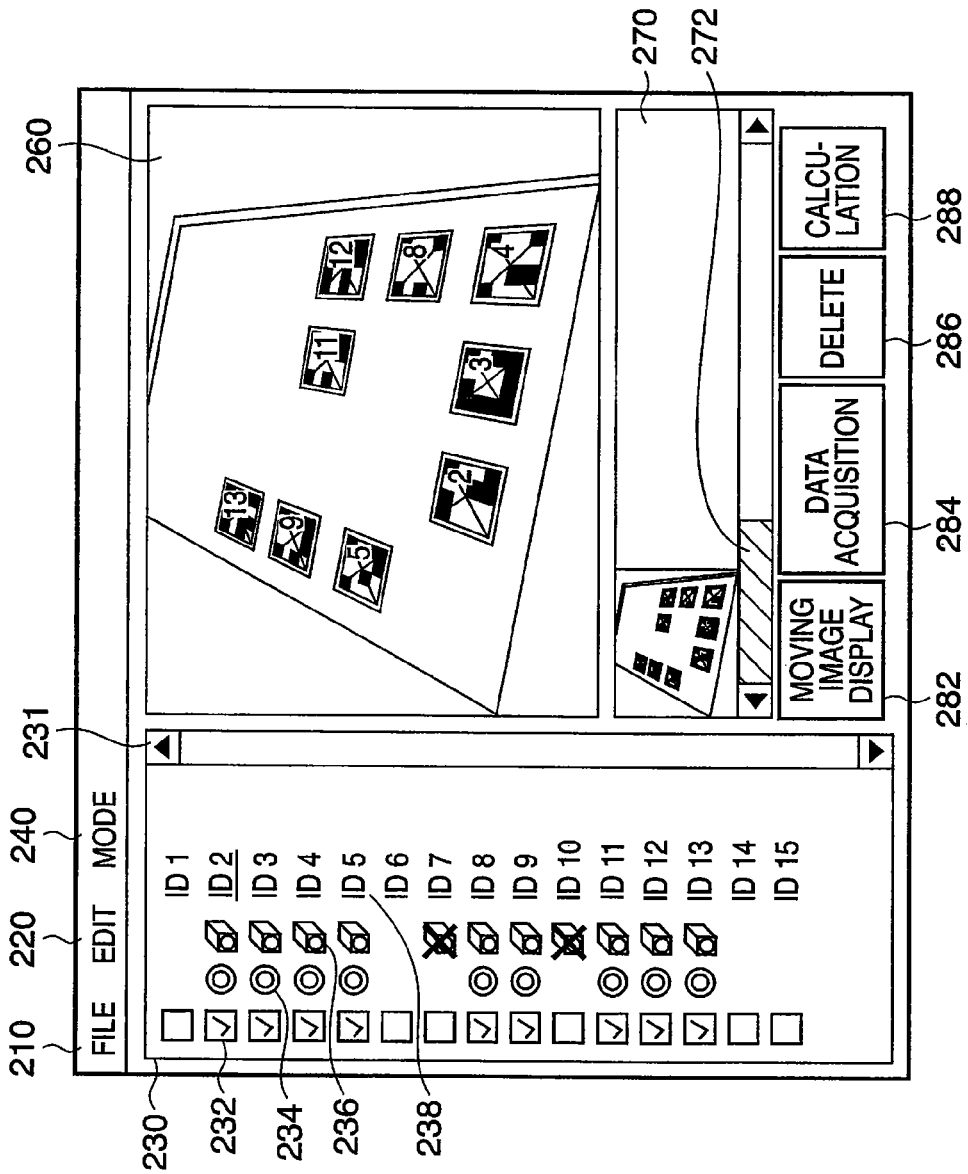

FIG. 19

| ID | MARKER STATE ||||| SIZE | POSITION | ORIENTATION |
|---|---|---|---|---|---|---|---|---|
| | REFERENCE MARKER FLAG | DETECTION FLAG | TARGET FLAG | OVERLAPPING FLAG | COMPLETION STATUS | | | |
| 1 | 0 | 1 | 1 | 0 | 2 | 40 | (0, 0, 0) | (0, 0, 0)0 |
| 7 | 1 | 1 | 1 | 0 | 1 | 40 | (10, −400, 200) | (0, 0, −1)90 |
| 45 | 0 | 1 | 1 | 1 | 1 | 40 | (20, 600, −200) | (0, 1, 0)0 |
| 125 | 0 | 1 | 0 | 0 | 0 | 40 | (500, 0, 800) | (0, 1, 0)0 |
| | | | | | | | | |
| | | | | | | | | |

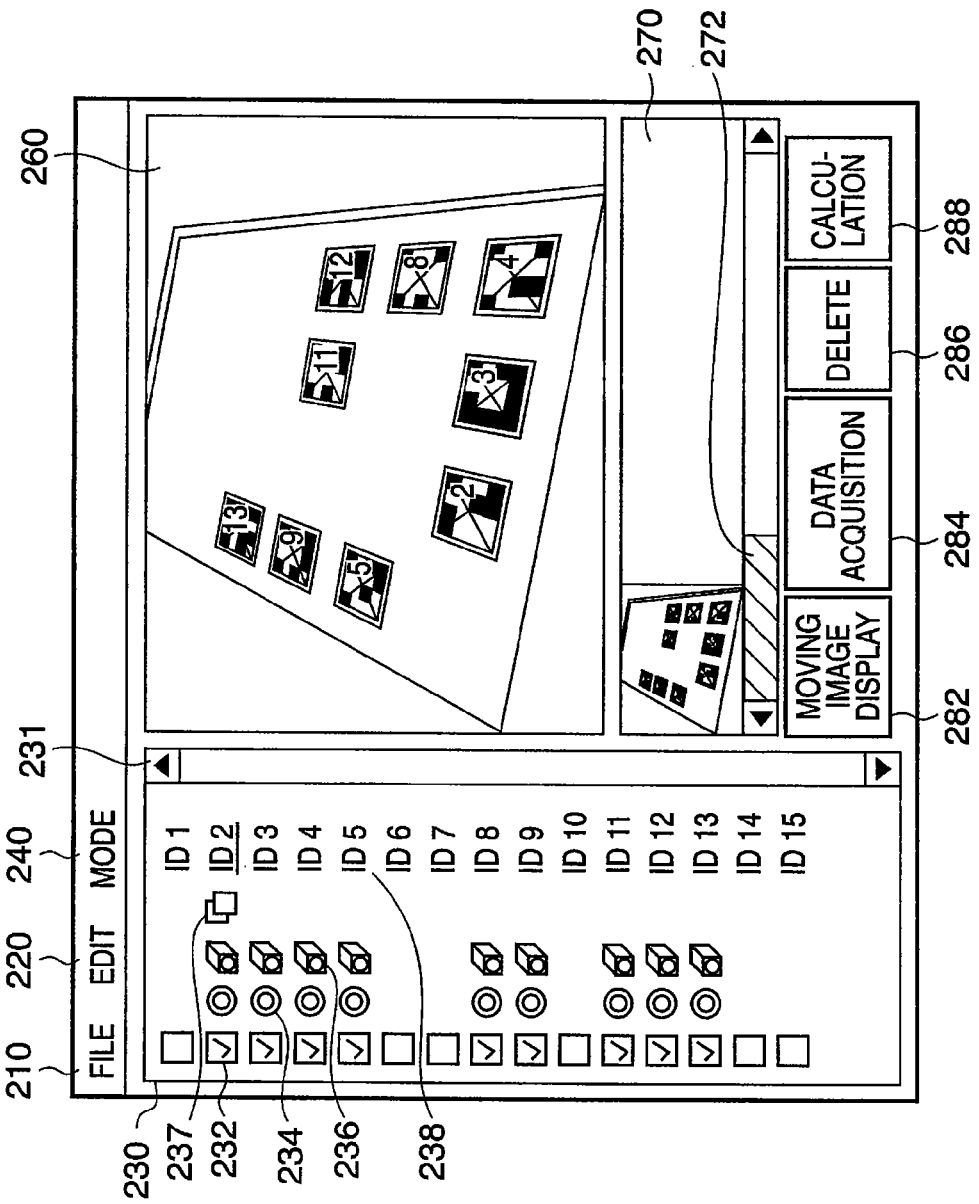

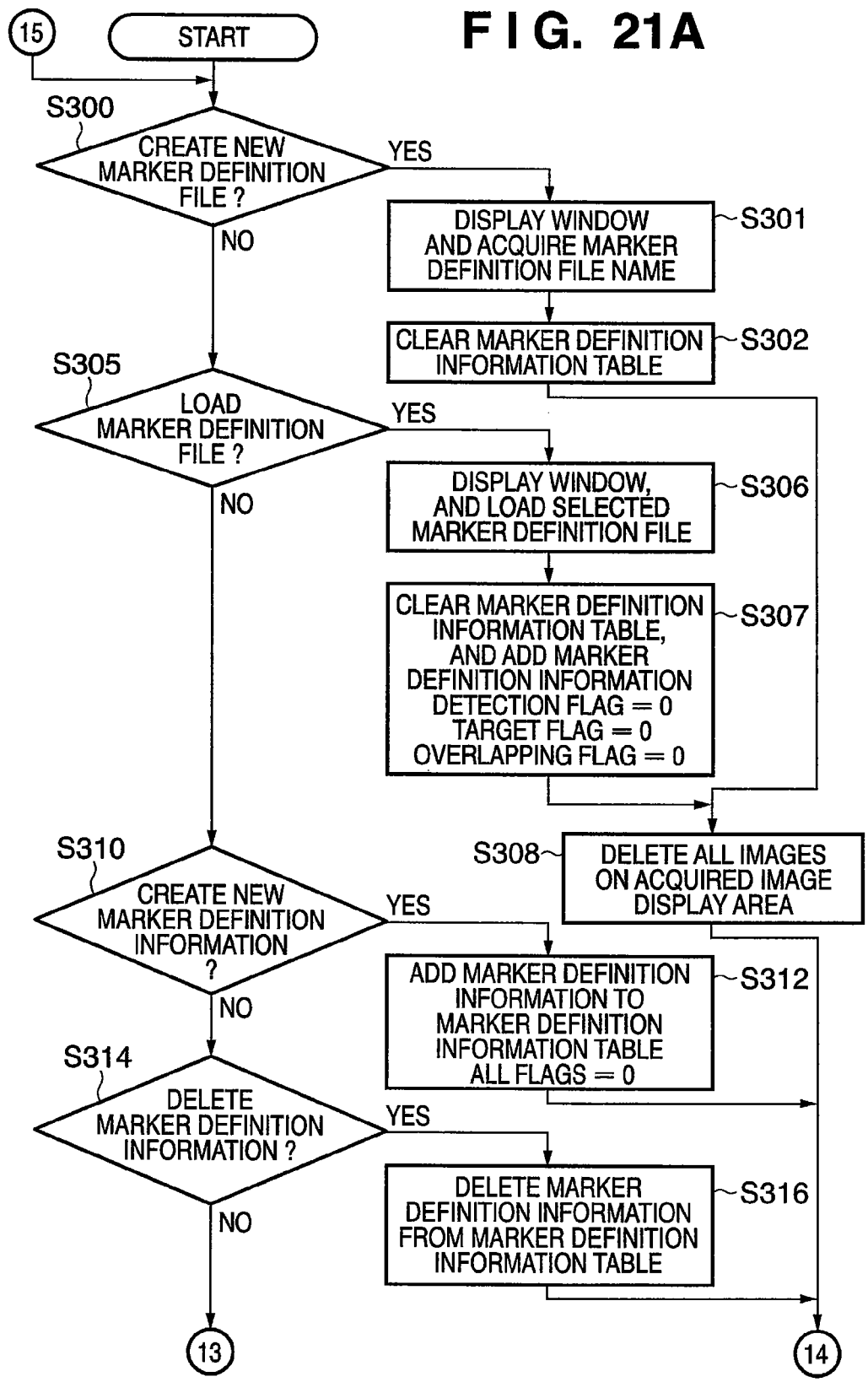

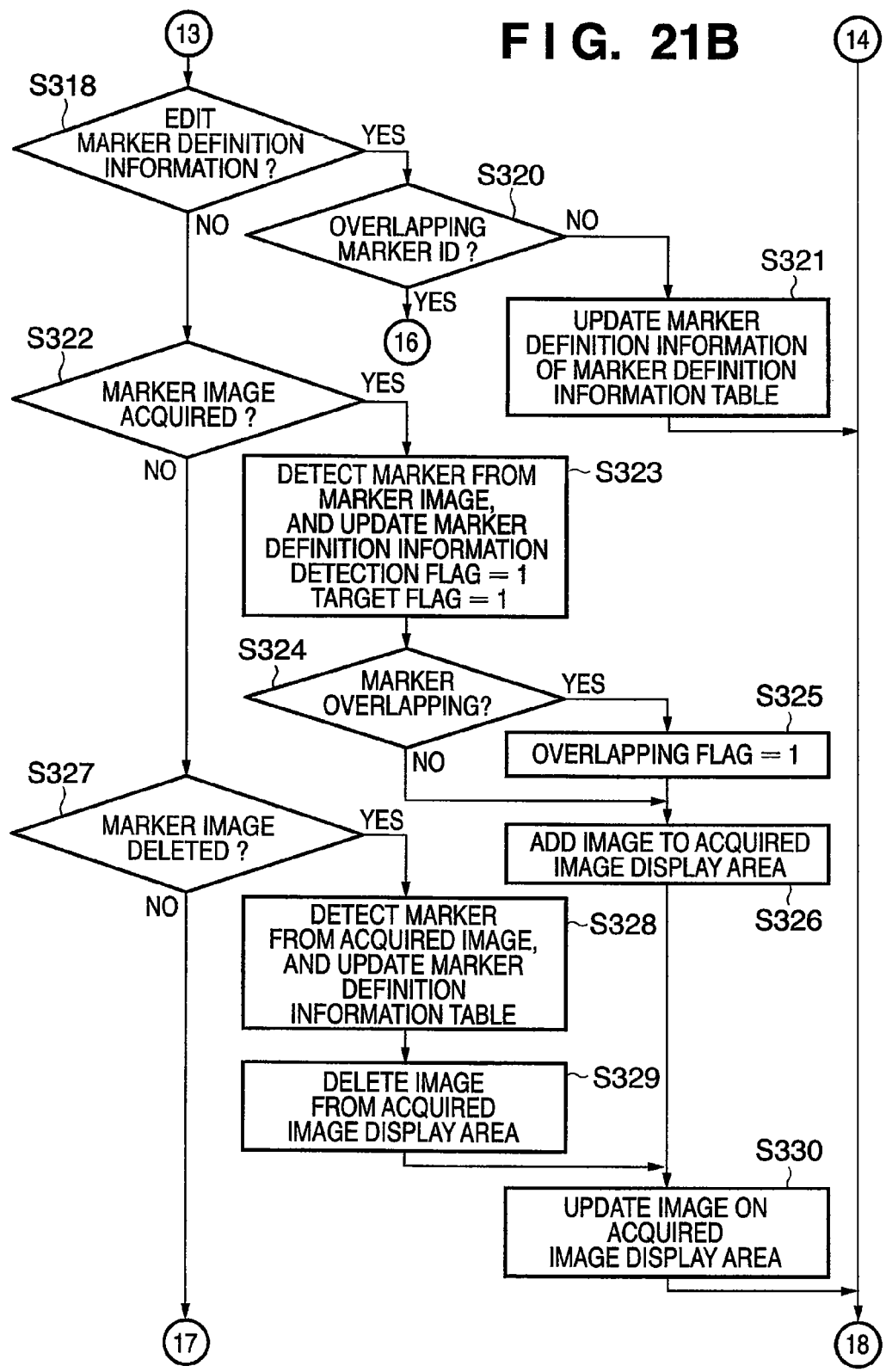

F I G. 24

| ID | MARKER STATE | | | | | SIZE | POSITION | ORIENTATION |
|---|---|---|---|---|---|---|---|---|
| | REFERENCE MARKER FLAG | DETECTION FLAG | TARGET FLAG | PRINT FLAG | COMPLETION STATUS | | | |
| 1 | 0 | 1 | 1 | 0 | 2 | 40 | (0, 0, 0) | (0, 0, 0)0 |
| 7 | 1 | 1 | 1 | 0 | 1 | 40 | (10, −400, 200) | (0, 0, −1)90 |
| 45 | 0 | 1 | 1 | 1 | 1 | 40 | (20, 600, −200) | (0, 1, 0)0 |
| 125 | 0 | 1 | 0 | 0 | 0 | 40 | (500, 0, 800) | (0, 1, 0)0 |
| | | | | | | | | |
| | | | | | | | | |

× : FEATURE POINT

✕, ●, ▲ : FEATURE POINT

✕, ●, ▲ : FEATURE POINT

✕, ●, ▲ : FEATURE POINT

●, ▲ : FEATURE POINT

●, ▲ : FEATURE POINT

●, ▲ : FEATURE POINT

IMAGE PROCESSING METHOD AND IMAGE PROCESSING APPARATUS OF CALCULATING POSITION AND ORIENTATION OF TARGET OBJECTS LOCATED IN IMAGE

BACKGROUND OF THE INVENTION

1. Field of the Invention

The present invention relates to a technique for calculating the position and orientation of an index present on a physical space.

2. Description of the Related Art

As one of important techniques for providing high-quality mixed reality, a registration technique of a physical space and virtual space is known. As the registration technique, various conventional methods have been proposed. Of these methods, a method of calculating (calibrating) the position and orientation of a camera from an image (index image) obtained by capturing an image of an index is popularly used in terms of cost and convenience.

Most of these methods are premised on that the positions and orientations of all indices on the space are given, and require measurement and input of the positions and orientations of the indices, in advance. As the indices, artificial markers (to be simply referred to as markers hereinafter) or natural features are generally used. When the markers are used, it becomes impractical to manually measure the positions and orientations of the markers as the number of markers to be allocated increases.

In order to broaden the range of the space that allows the registration processing, a large number of markers must be set over a broad range. Therefore, means for efficiently and precisely measuring the positions and orientations of these large number of markers set over a broad range is required.

In recent years, a method of calibrating the relative positions and orientations of markers based on an image obtained by capturing an image of markers has been proposed (see D. Kotake, S. Uchiyama, and H. Yamamoto, "A marker calibration method utilizing a priori knowledge on marker arrangement," Proc. Third IEEE and ACM International Symposium on Mixed and Augmented Reality (ISMAR'04), PP. 89-98, November 2004).

After the relative positions and orientations of all markers by this method, if the position and orientation of an arbitrary marker on a world coordinate system are determined, the positions and orientations of all the markers on the world coordinate system can be calculated.

An overview of the operation required for the registration processing and the calibration processing in this method is as follows.

(1.1) Markers are generated and are allocated on a space that is to undergo registration processing.

(1.2) The position and orientation of a marker (reference marker) whose position and orientation on the world coordinate system are determined are input.

(1.3) An image of the markers is captured.

(1.4) Calibration is executed.

(a) The relative position and orientation between one marker and the camera are calculated based on the image including a plurality of markers.

(b) The relative position and orientation between another marker and the camera are calculated.

(c) The relative position and orientation between the two markers are calculated.

(d) These processes are executed for all images including the plurality of markers, and the relative positions and orientations among all of the markers are calculated.

(e) The absolute positions and orientations of all the markers (relative markers) other than the reference marker are calculated based on the reference marker.

(1.5) The registration processing is executed using the markers whose positions and orientations are calculated by the calibration.

Registration using common natural features includes two processes, i.e., generation of a natural feature database and estimation of the position and orientation of a camera using the natural feature database (Iryna Skrypnyk and David G. Lowe: "Scene Modelling, Recognition and Tracking with Invariant Image Features", Proc. Third IEEE and ACM International Symposium on Mixed and Augmented Reality, pp. 110-119, 2004). The natural feature database is generated using a large number of images obtained by capturing images of the physical space as in the marker calibration. An overview of the operations required for the registration processing using natural features is as follows.

(2.1) A plurality of images of the physical space are captured.

(2.2) Features are extracted from the images.

(2.3) The position of a given feature is calculated from the plurality of images.

(a) Images of that feature on the plurality of images are associated with each other.

(b) The relative position and orientation among the plurality of images are calculated based on the association.

(c) The three-dimensional (3D) position of the feature is calculated based on the relative position and orientation.

(d) The above processes are executed for all of the extracted features.

(2.4) The position and orientation of the camera are estimated using the generated natural feature database to execute registration.

With the existing method, when markers are used, all of the markers captured in the operation (1.3) are calibrated in (1.4) above, and are used in the registration processing (1.5).

As the number of markers used increases, the registration precision improves. In such case, however, since the load on the registration processing and calibration processing becomes heavier, it is desirable to use a smaller number of markers. When the operator carefully captures an image of only required markers, the number of markers can be reduced to some extent. However, such operation requires operator's experience and skill. For this purpose, in practice, the operator repeats the operations (1.1) to (1.5) to empirically determine an optimal allocation and number of markers.

At this time, with the existing method, when an arbitrary marker is excluded from the calibration or registration processing, all or some of the captured images are discarded so that the marker to be excluded is not included in the captured images. After that, the calibration is executed again. Or after the marker is removed from the space, images are captured again to execute the calibration.

When a plurality of image processing apparatuses which perform calibration and registration processing are used in neighboring spaces, a given image processing apparatus is more likely to accidentally capture an image of markers which are set to be used by the neighboring image processing apparatus in addition to those to be used by itself in the operation (1.1). In this case, unnecessary registration processing and calibration processing must be done.

Furthermore, the marker IDs of the markers which are set to be used by the self image processing apparatus are more likely to overlap those of the markers which are set to be used by the neighboring image processing apparatus. In this case, the calibration and registration processing do not work correctly.

Such marker ID overlapping also occurs when markers which are generated as auxiliary markers and are carelessly left on the space where the calibration and registration processing are done are accidentally captured. Also, the marker ID overlapping occurs by recognition errors of markers in the image processing.

These recognition errors of markers occur due to disturbances such as image capturing an object similar to a marker, parameters such as an exposure value, stop value, and the like of a device for capturing an image of markers, a light condition in an image capture environment, and the like, and it is difficult to avoid such recognition errors even when the operator of the image processing apparatus exercises extra caution.

With the existing method, in order to exclude overlapping markers from the calibration or registration processing, after all or some of captured images are discarded, an image of all markers except for the overlapping markers is captured again.

On the other hand, upon using natural features, the positions of features extracted in the operation (2.2) are calculated by the processing (2.3) to generate a natural feature database, which is used in the registration processing (2.4).

With the existing method, many similar features may appear. In this case, upon generation of the natural feature database or execution of the registration processing, similar features may be associated with each other as identical features, thus causing operation errors.

SUMMARY OF THE INVENTION

The present invention has been made in consideration of the aforementioned problems, and has as its object to provide a technique for automatically or semi-automatically selecting indices to be used in the calibration and registration processing.

It is another object of the present invention to reduce the load on the setting operation for the registration to be done by the operator by notifying the operator of operations required to execute the calibration.

Further features of the present invention will become apparent from the following description of exemplary embodiments with reference to the attached drawings.

BRIEF DESCRIPTION OF THE DRAWINGS

FIG. 1 shows an example of the configuration (format) of a marker used in the first embodiment of the present invention;

FIG. 2 shows an example of an actual marker generated according to the format shown in FIG. 1;

FIG. 5 shows an example of the configuration of a table (marker definition information table) which registers marker definition information for each individual marker;

FIG. 8 shows a display example of an edit menu;

FIG. 15 shows an example of the configuration of marker definition information according to the second embodiment of the present invention;

FIG. 16 shows a display example of a GUI (graphical user interface) which runs on a computer and is used to calculate the positions and orientations of indices arranged on the physical space;

FIG. 19 shows an example of the configuration of marker definition information according to the third embodiment of the present invention;

FIG. 20 shows a display example of a GUI (graphical user interface) which runs on a computer and is used to calculate the positions and orientations of indices arranged on the physical space;

FIGS. 21A and 21B are flowcharts of various processes to be executed using the GUI shown in FIG. 20;

FIG. 24 shows an example of the configuration of marker definition information according to the fourth embodiment of the present invention;

DESCRIPTION OF THE EMBODIMENTS

Preferred embodiments of the present invention will now be described in detail in accordance with the accompanying drawings.

First Embodiment

This embodiment will explain a case in which markers are used as an example of indices.

FIG. 1 shows an example of the configuration (format or pattern) of a marker used in this embodiment. As shown in FIG. 1, a marker used in this embodiment is configured by 4×4 small squares, which are further classified into four corners blk1 to blk3 and wht, and squares c1 to c4 and x1 to x8. Each small square is painted in either white or black and expresses a bit value "0" or "1" by its paint color. For example, a small square pained in white expresses a bit value "0", and a small square pained in black expresses a bit value "1".

Figure 3:
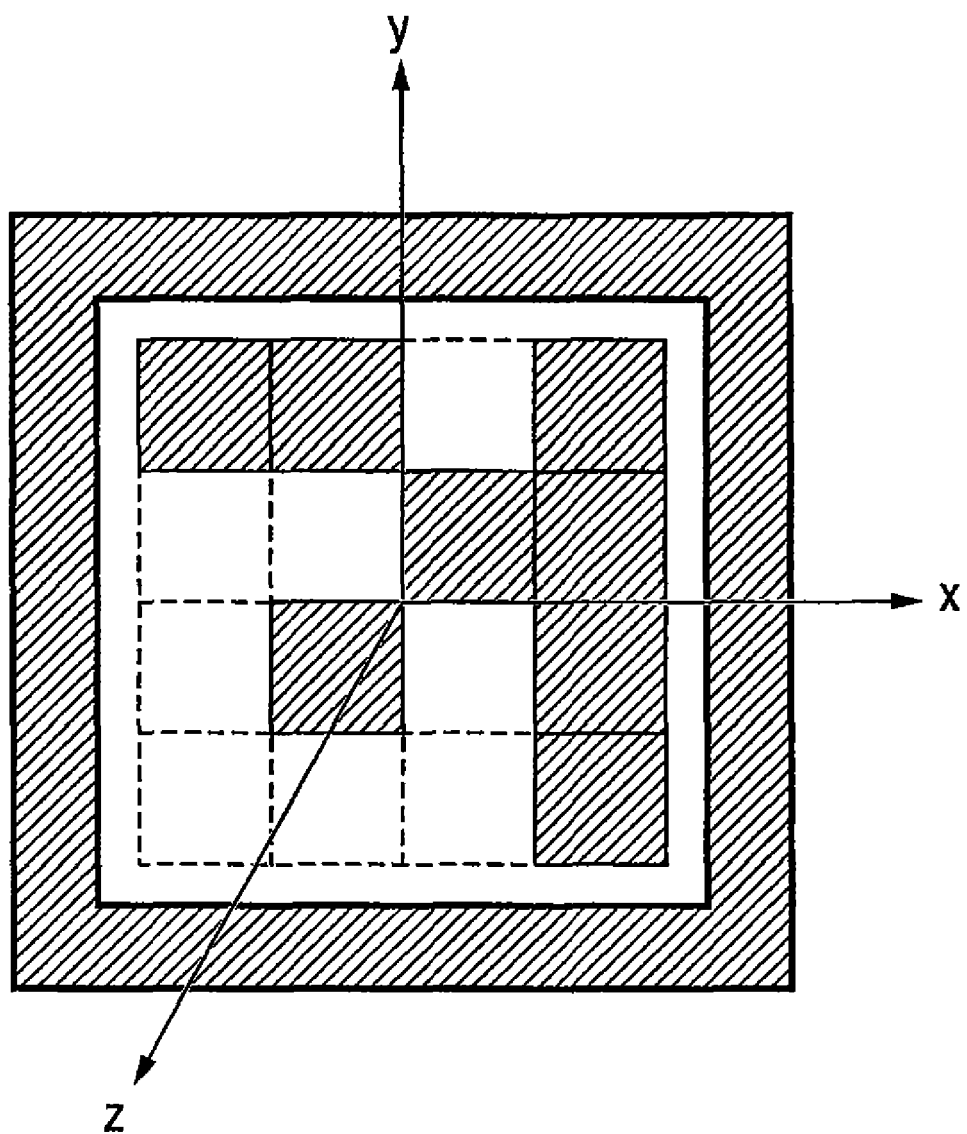
FIG. 3 shows a marker coordinate system.

The small squares blk1 to blk3 and wht of the four corners will be explained first. One of the small squares of the four corners is white (wht), and the remaining three squares are black (blk1 to blk3). These small squares are used to define a marker coordinate system. The marker coordinate system is a coordinate system defined for each marker. More specifically, this coordinate system is defined to have the direction of a line segment that connects blk1 and blk2 as a positive direction of the x-axis, the direction of a line segment that connects blk3 and blk2 as a positive direction of the y-axis, and a direction normal to the marker as a positive direction of the z-axis, and the central position of the marker as an origin. FIG. 3 shows the marker coordinate system. The position of the marker on the world coordinate system is determined by the position of the origin of the marker coordinate system on the world coordinate system. The orientation of the marker on the world coordinate system is determined by the state of rotation of the marker coordinate system with reference to the world coordinate system.

Hence, the relative position and orientation between a camera which captures an image of such marker and that marker can be calculated by a known technique using the marker shape, the lengths of sides, and the central position in the marker image.

Next, the small squares c1 to c4 and x1 to x8 will be described below. The small squares x1 to x8 are used to express an identifier (marker ID) unique to that marker. Since x1 to x8 can express 8 bits, the marker ID can assume a value ranging from 0 to 255. The small squares c1 to c4 serve as check bits, and are used in correction when recognition errors of information bits have occurred in image processing.

The check bit values are calculated by:

$$c1 = \text{not } (x1 + x2 + x3 + x5 + x6)$$

$$c2 = \text{not } (x2 + x3 + x4 + x6 + x7)$$

$$c3 = \text{not } (x3 + x4 + x5 + x7 + x8)$$

$$c4 = \text{not } (x1 + x4 + x5 + x6 + x8)$$

FIG. 2 shows an example of an actual marker generated according to the format shown in FIG. 1. As described above, each individual small square is pained in white or black, and expresses assigned information. Note that the marker size is not particularly limited. In this embodiment, assume that all the markers to be arranged on the physical space have the same length of one side.

Figure 4:
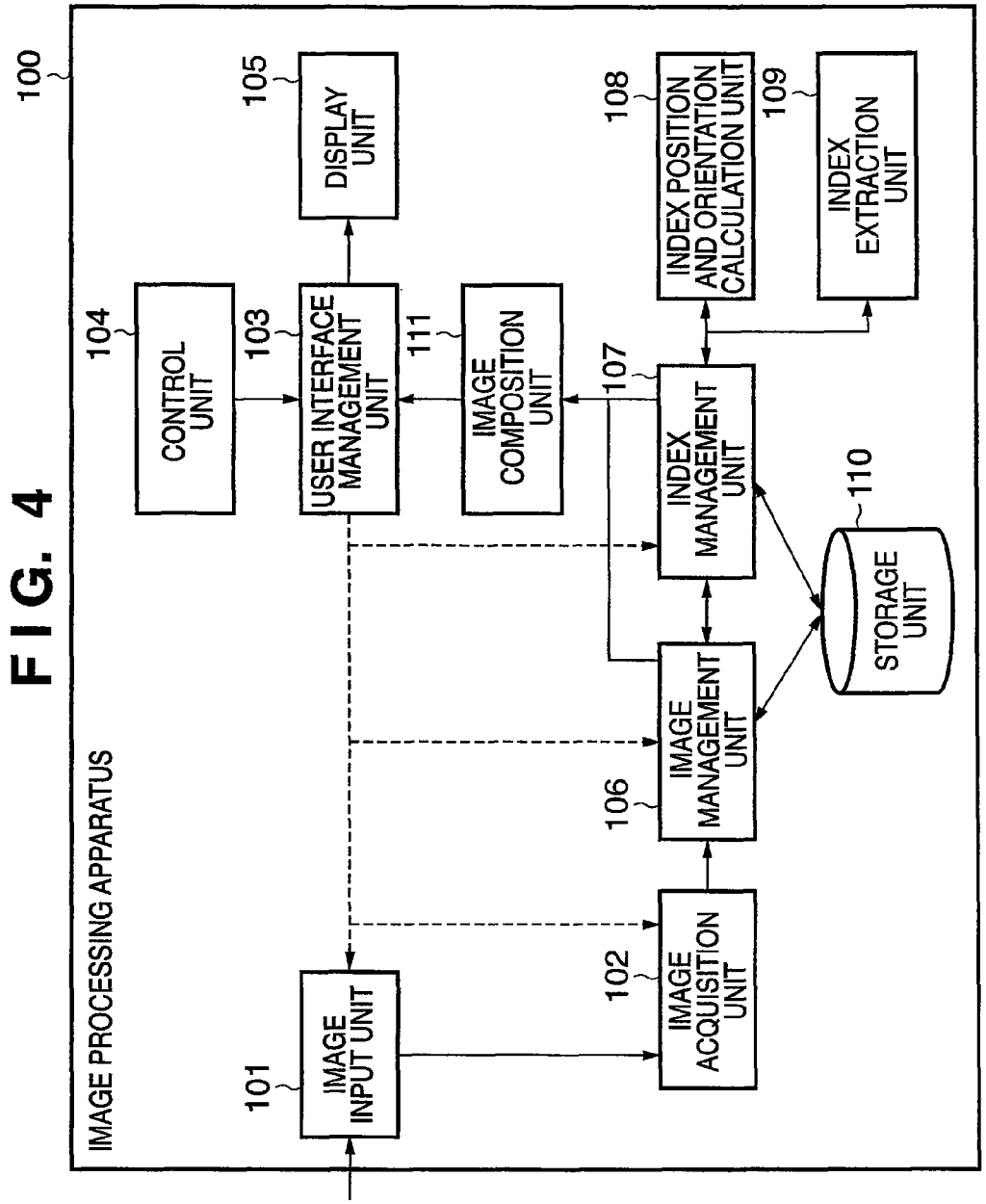
FIG. 4 is a block diagram showing the functional arrangement of an image processing apparatus according to the first embodiment of the present invention.

An image processing apparatus according to this embodiment, which calculates the position and orientation of such marker will be described below. FIG. 4 is a block diagram showing the functional arrangement of an image processing apparatus according to this embodiment.

Referring to FIG. 4, reference numeral 100 denotes an image processing apparatus main body. An image input unit 101 acquires an image supplied from an external device such as a digital camera, hard disk device, or the like. The image to be acquired is an image of the physical space on which a plurality of markers described using FIGS. 1 to 3 are allocated. The image input unit 101 supplies the acquired image to an image acquisition unit 102 of the subsequent stage.

The image acquisition unit 102 applies various pre-processes such as conversion into a format that can be handled by this apparatus, and the like to the image received from the image input unit 101. The image acquisition unit 102 outputs the processed image to an image management unit 106 of the subsequent stage.

Upon reception of the image from the image acquisition unit 102, the image management unit 106 stores that image in a storage unit 110. Also, the unit 106 reads out the images stored in the storage unit 110 and marker definition information (to be described later) as needed, and outputs them to an index management unit 107 and image composition unit 111.

The storage unit 110 is used to store images received from the image management unit 106 and marker definition information (to be described below).

Note that the marker definition information is a set of various kinds of information associated with a marker, and is stored for each marker. The marker definition information includes a marker ID, marker state, marker size, and marker position and orientation. The marker definition information is stored in the storage unit 110 in a table format shown in, e.g., FIG. 5.

FIG. 5 shows an example of the configuration of a table (marker definition information table) which registers marker definition information for each individual marker. As shown in FIG. 5, the table registers "marker ID", "marker state", "marker size", and "marker position and orientation" for each individual marker.

"Marker ID" corresponds to x1 to x8 marked on the marker, as described above. That is, the marker ID registers a value indicated by a bit array (x1 to x8).

"Marker state" includes a reference marker flag, detection flag, target flag, and completion status, as shown in FIG. 5.

The reference marker flag indicates whether or not the marker of interest is a reference marker. If the reference marker flag is "1", it indicates that the marker of interest is a reference marker; if it is "0", it indicates that the marker of interest is not a reference marker (in other words, that marker is a relative marker). FIG. 5 shows that only a marker, which has a marker ID=7 and a reference marker flag=1, is a reference marker.

The detection flag indicates whether or not the marker of interest is detected from an image output from the image acquisition unit 102. If the detection flag is "1", it indicates that the marker of interest is detected from the image; if it is "0", it indicates that the marker of interest is not detected from the image. FIG. 5 shows that markers with marker IDs=1, 7, 45, and 125 are detected from an image, since they have a detection flag=1.

The target flag indicates whether or not the marker of interest is a position and orientation calculation target (i.e., a calibration target). If the target flag is "1", it indicates that the marker of interest is a calculation target; if it is "0", it indicates that the marker of interest is not a calculation target. FIG. 5 shows that markers which have marker IDs=1, 7, and 45 and a target flag=1, are calibration targets. Also, FIG. 5 shows that a marker, which has a marker ID=125 and a target flag=0, is not a calibration target.

The completion status is a flag indicating whether or not the calibration of the marker of interest is complete. If the completion status is "1", the position and orientation calculations are complete; if it is "0", the position and orientation calculations are not complete yet; if it is "2", the position and orientation calculations have failed and the position and orientation are not calculated correctly. In FIG. 5, a marker with a marker ID=1 has a completion status=2, and the position and orientation of this marker are not correctly calculated. Also, markers with marker IDs=7 and 45 have a completion status=1, and the positions and orientations of these markers are correctly calculated. A marker with a marker ID=125 has a completion status=0, and the position and orientation calculations are not executed for this marker yet.

"Marker size" indicates the length of one side of each marker. As described above, assume that all the markers have the same length of one side. In FIG. 5, all the markers with marker IDs=1, 7, 45, and 125 have one side length="40".

"Marker position and orientation" indicate the position and orientation of the marker of interest on the world coordinate system. Note that the orientation of the marker is expressed by a rotation axis vector and rotation angle. That is, the orientation of the marker expresses a state wherein the marker coordinate system is rotated clockwise about the rotation axis vector while the respective axes of the world coordinate system match those of the marker coordinate system.

Data of the aforementioned table are registered in the storage unit 110.

Referring back to FIG. 4, the index management unit 107 executes processing for outputting information output from the storage unit 110 and image management unit 106 to an index position and orientation calculation unit 108 and index extraction unit 109.

The index position and orientation calculation unit 108 executes processing for calculating the position and orientation, on the world coordinate system, of a marker specified as a position and orientation calculation target by processing to be described later. The index extraction unit 109 executes processing for detecting a marker from an image received from the storage unit 110 via the index management unit 107. The results of the index position and orientation calculation unit 108 and index extraction unit 109 are output to the index management unit 107. That is, the index management unit 107 manages various kinds of information associated with indices.

The image composition unit 111 generates a computer graphics (CG) that allows the user to easily understand marker information such as a marker ID and the outline shape of a marker for a marker specified as a position and orientation calculation target by the processing to be described later. Then, the unit 111 executes processing for superimposing the generated CG on the image received from the storage unit 110 via the index management unit 107. The image processed by the image composition unit 111 is output to a user interface management unit 103 of the subsequent stage.

The user interface management unit 103 manages information to be displayed on a display screen of a display unit 105, and outputs the image received from the image composition unit 111 to the display unit 105. The user interface management unit 103 also executes processing for accepting various instructions received from a control unit 104, controlling the respective units according to the accepted instructions, and making a display according to the control result on the display screen of the display unit 105.

The display unit 105 comprises a CRT, liquid crystal display, or the like, and can display various processing results by means of images, text, and the like. The control unit 104 receives operation instructions from the operator of this apparatus, and notifies the user interface management unit 103 of these instructions.

Figure 30:
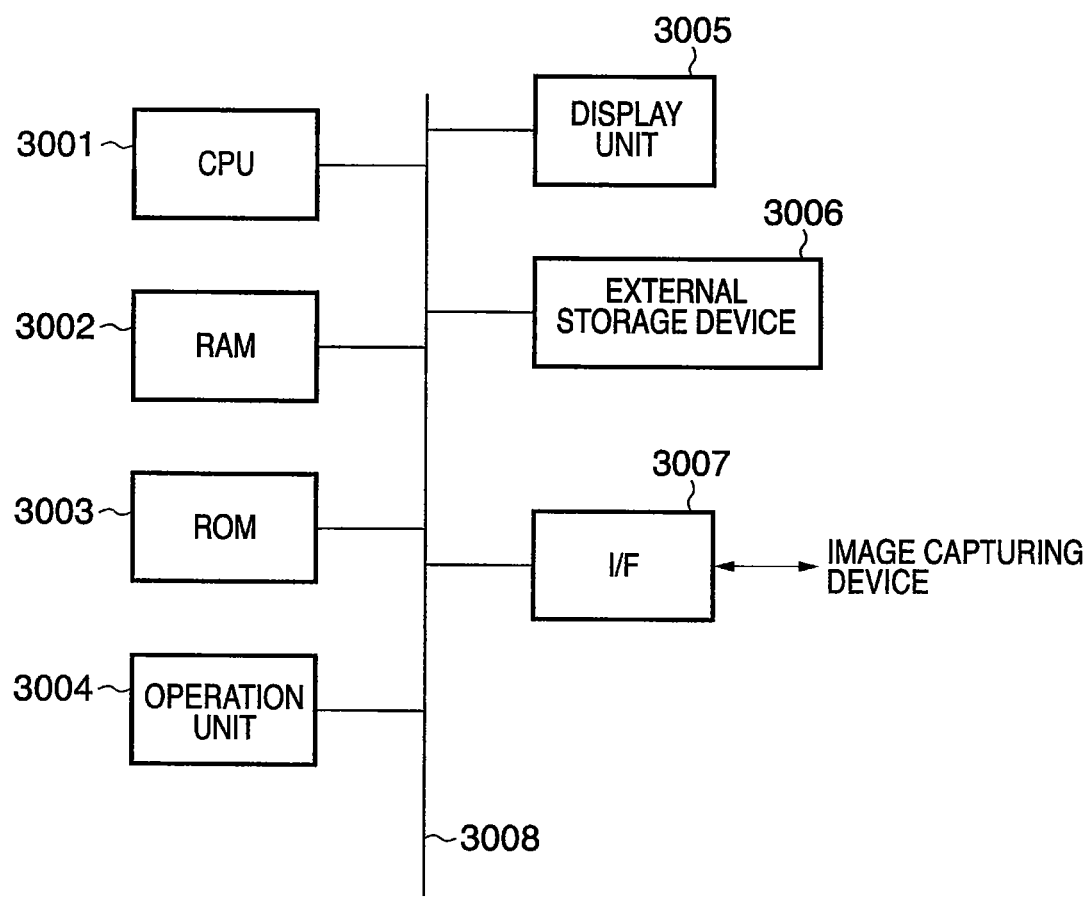
FIG. 30 is a block diagram showing the hardware arrangement of a computer which is applicable to an image processing apparatus 100.

FIG. 30 is a block diagram showing the hardware arrangement of a computer which is applicable to the image processing apparatus 100.

Reference numeral 3001 denotes a CPU which controls the overall computer using programs (computer programs) and data stored in a RAM 3002 and ROM 3003, and executes respective processes to be described later, which are implemented by this computer. For example, in the arrangement of the image processing apparatus 100 shown in FIG. 4, the functions of the respective units except for the image input unit 101, storage unit 110, and display unit 105 are implemented as some of the functions of the CPU 3001.

The RAM 3002 has an area for temporarily storing programs and data loaded from an external storage device 3006, and data (captured images in case of this embodiment) acquired from an external device (an image capturing device such as a camera or the like in case of this embodiment) via an I/F (interface) 3007. Furthermore, the RAM 3002 has a work area used when the CPU 3001 executes various processes. In this manner, the RAM 3002 can provide areas as needed as various usages.

The ROM 3003 stores setting data, a boot program, and the like of this computer.

Reference numeral 3004 denotes an operation unit, which comprises a keyboard, mouse, and the like. When the operator operates the operation unit 3004, he or she can input various instructions to the CPU 3001.

Reference numeral 3005 denotes a display unit, which comprises a CRT, liquid crystal display, or the like, and can display the processing results of the CPU 3001 by means of images, text, and the like. The display unit 3005 corresponds to the display unit 105 in FIG. 4.

The external storage device 3006 is a large-capacity information storage device represented by a hard disk drive. The external storage device 3006 saves an OS (operating system), various kinds of information (data) held by the storage unit 110, and programs and data for making the CPU 3001 execute respective processes to be described later, which are implemented by this computer. These programs and data are loaded onto the RAM 3002 as needed under the control of the CPU 3001. The CPU 3001 executes processing using the loaded programs and data, thus executing respective processes to be described later, which are implemented by this computer.

The I/F 3007 serves as an interface for connecting, to this computer, an image capturing device that captures an image of the physical space on which the plurality of markers are allocated, in case of this embodiment. An image captured by this image capturing device is input to the RAM 3002 and external storage device 3006 of this computer via the I/F 3007.

Reference numeral 3008 denotes a bus which interconnects the aforementioned units.

Note that the hardware arrangement of the computer which is applicable to the image processing apparatus 100 according to this embodiment is not limited to that shown in FIG. 30, and any other arrangements may be adopted as long as they can execute respective processes to be described later, which are to be implemented by the image processing apparatus 100.

Figure 6:
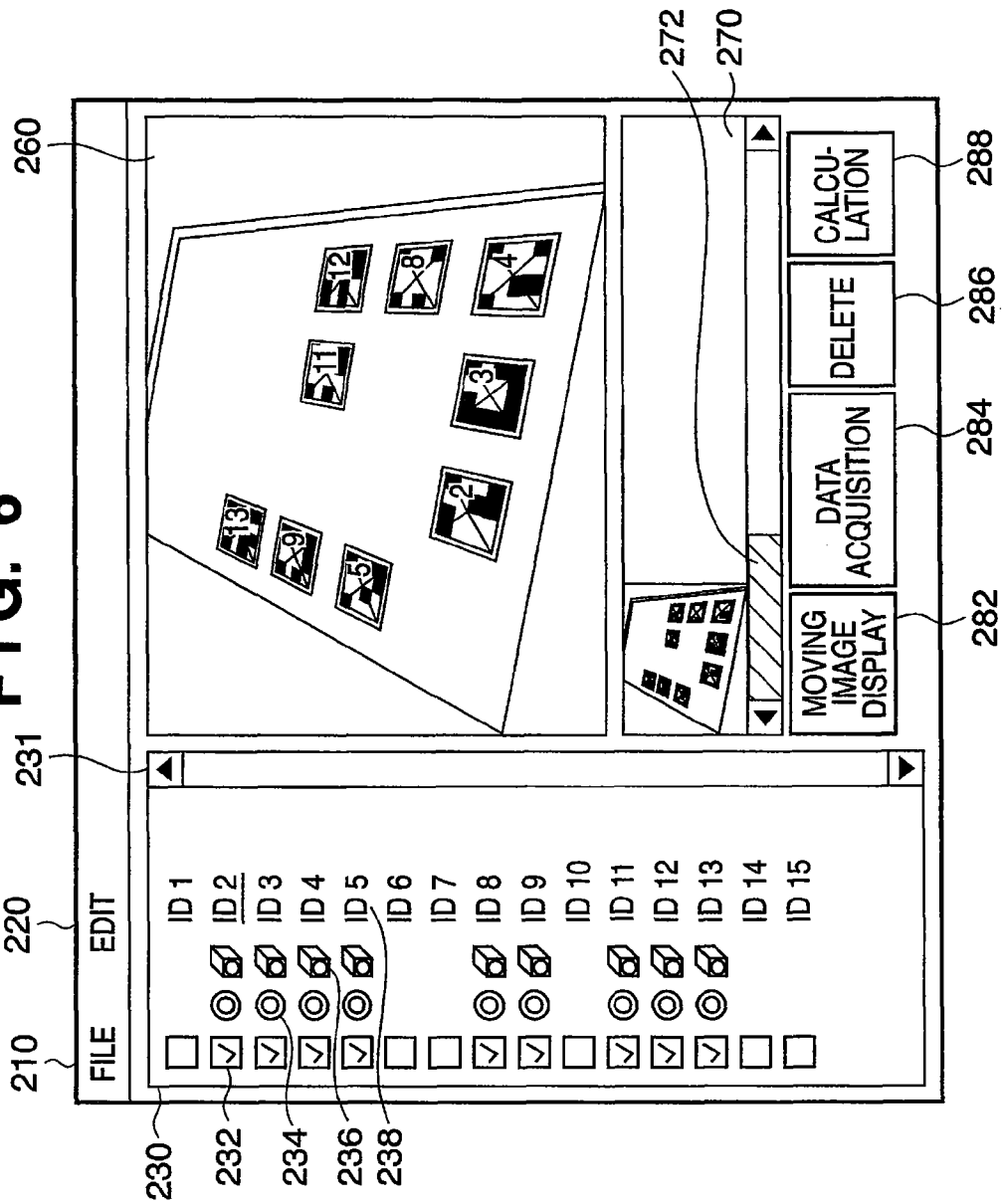
FIG. 6 shows a display example of a GUI (graphical user interface) which runs on a computer and is used to calculate the positions and orientations of indices arranged on the physical space.

A GUI (graphical user interface) which runs on the computer and is used to calculate the positions and orientations of indices arranged on the physical space will be described below. FIG. 6 shows a display example of this GUI. Note that programs and data associated with the GUI shown in FIG. 6 are saved in the external storage device 3006. These programs and data are loaded onto the RAM 3002, and the CPU 3001 executes processing using the loaded programs and data, thus displaying a window having the configuration shown in FIG. 6 on the display screen of the display unit 3005. The same applies to other windows to be described later.

In the following description, assume that the operator of this computer operates the GUI using the operation unit 3004, and the CPU 3001 implements processing to be executed by this operation, unless otherwise specified.

Figure 7:
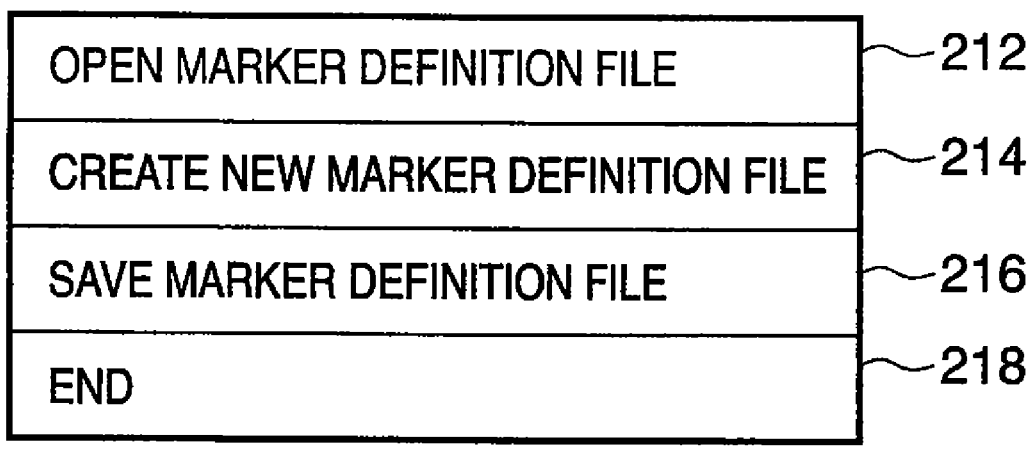
FIG. 7 shows a display example of a file menu.
Figure 10:
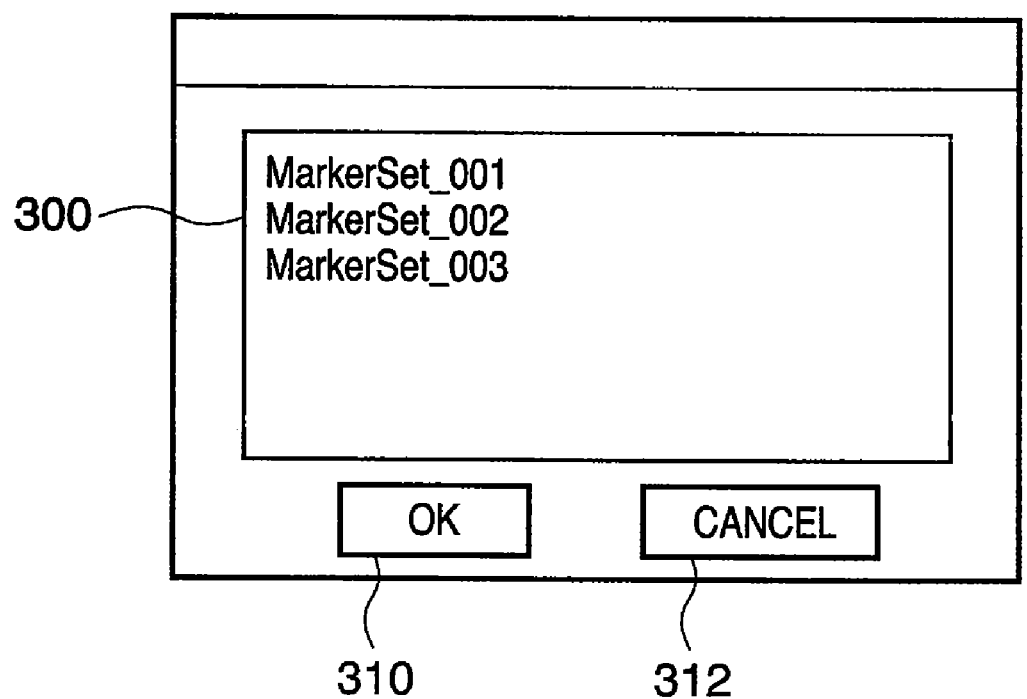
FIG. 10 shows a display example of a window.

When the operator designates a "file" menu 210 on the GUI shown in FIG. 6, a file menu shown in FIG. 7 is displayed on the display screen of the display unit 3005. When the operator designates an "open marker definition file" menu 212 on the file menu shown in FIG. 7, a window shown in FIG. 10 is displayed on the display screen of the display unit 3005. On the window shown in FIG. 10, reference numeral 300 denotes an area for displaying a list of file names of marker definition files saved in the external storage device 3006. The operator of this computer can select one of the file names displayed within this area 300 using the operation unit 3004. The marker definition file is a file that records the data of the table shown in FIG. 5. When a plurality of marker definition files are saved in the external storage device 3006, the operator can select one of these files via the GUI shown in FIG. 10.

When the operator selects one file and designates an "OK" button 310, the image processing apparatus clears the display of the window shown in FIG. 10, and updates the displayed contents in an area 230 on the GUI shown in FIG. 6 according to the contents of the selected file. Details of information displayed in the area 230 will be described later.

Figure 11:
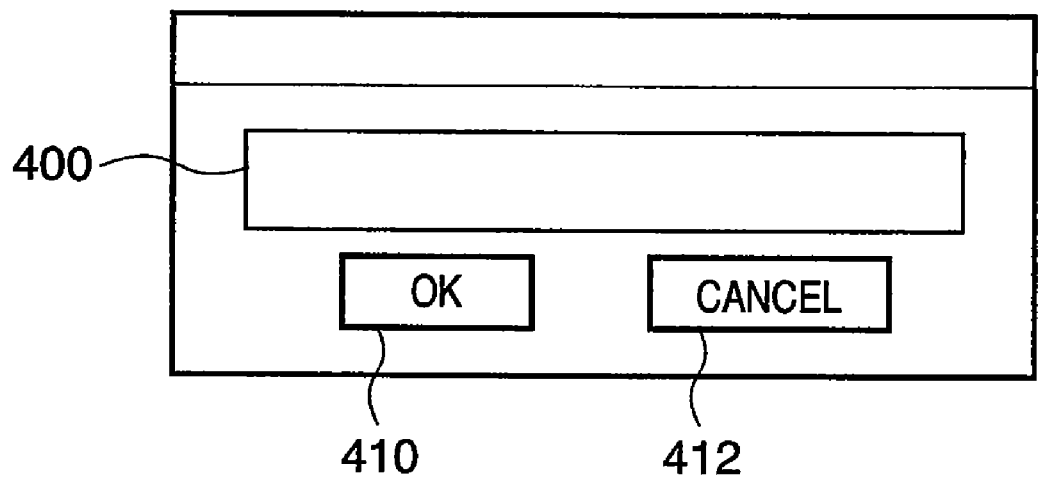
FIG. 11 shows a display example of a window.

Referring back to the file menu in FIG. 7, when the operator designates a "create new marker definition file" menu 214, a window shown in FIG. 11 is displayed on the display screen of the display unit 3005. On the window shown in FIG. 11, reference numeral 400 denotes a field used to input a file name of a new marker definition file to be created. When the operator of this computer inputs the file name of the new marker definition file to be created in the field 400 using the operation unit 3004, and then designates the "OK" button 310, the image processing apparatus clears the display of the window shown in FIG. 11, and creates the marker definition file having the file name input to the field 400 in the external storage device 3006.

Referring back to the file menu in FIG. 7, when the operator designates a "save marker definition file" menu 216, the CPU 3001 executes processing for saving the currently opened marker definition file in the external storage device 3006.

When the operator designates an "end" menu 218, the CPU 3001 executes processing associated with shutdown using a known shutdown function of the OS, thus shutting down this computer.

Referring back to the GUI shown in FIG. 6, when the operator designates an "edit" menu 220, an edit menu shown in FIG. 8 is displayed on the display screen of the display unit 3005. When the operator designates a "create new marker definition information" menu 222 on the edit menu shown in FIG. 8, the CPU 3001 creates new marker definition information, and additionally registers that information in the currently opened marker definition file. After the additional registration, the CPU 3001 updates the display contents in the area 230 on the GUI in FIG. 6 in accordance with the contents of the currently opened marker definition file. In order to avoid marker ID overlapping, a marker ID of the newly created marker definition information uses an unused value in the marker definition table. The operator can change the newly created marker definition information on a window to be described later.

Referring back to the edit menu in FIG. 8, when the operator designates a "delete marker definition information" menu 224, the CPU 3001 deletes the currently selected marker definition information in the area 230 on the GUI in FIG. 6 from the currently opened marker definition file. After deletion, the CPU 3001 updates the display contents in the area 230 on the GUI in FIG. 6 according to the contents of the currently opened marker definition file. Upon updating the display contents, the deleted marker definition information ceases to be displayed.

Figure 9:
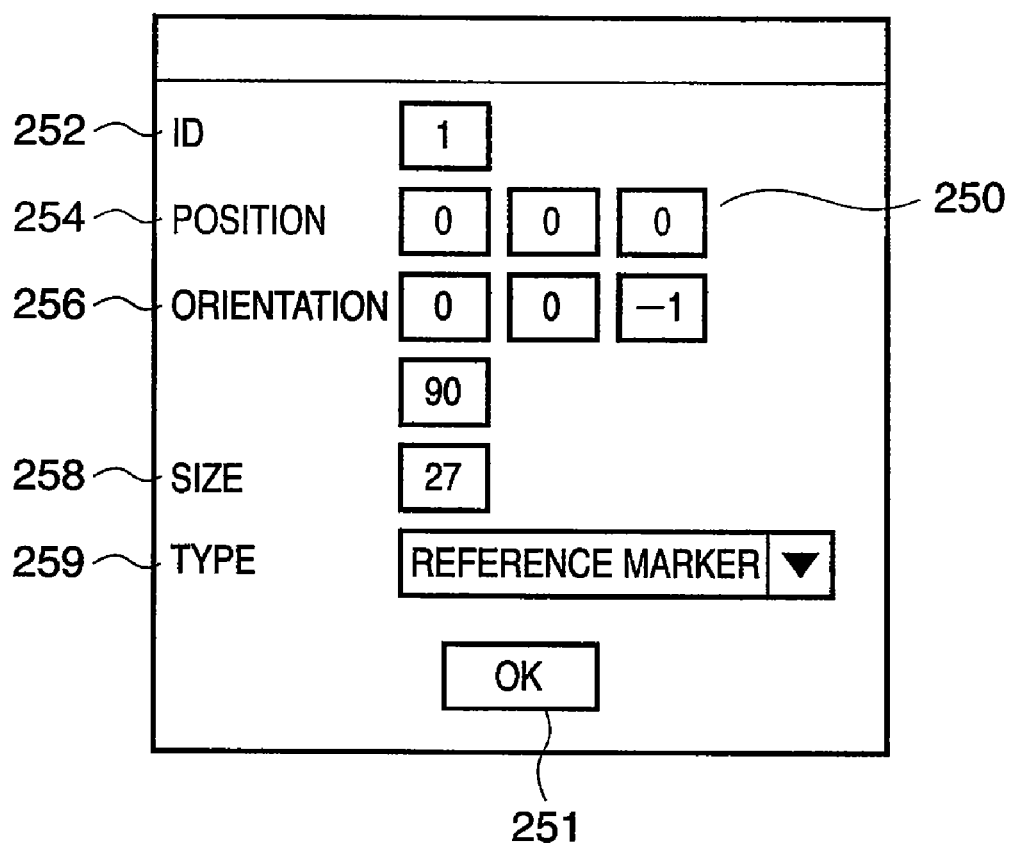
FIG. 9 shows a display example of a window.

When the operator designates an "edit marker definition information" menu 226, a window shown in FIG. 9 is displayed. The window shown in FIG. 9 is used to edit the currently selected marker definition information in the area 230. Reference numeral 250 denotes a window main body.

Reference numeral 252 denotes a field used to input a marker ID in the currently selected marker definition information. A value input to this field 252 is used as the marker ID in the currently selected marker definition information.

Reference numeral 254 denotes fields used to input the marker position in the currently selected marker definition information. Values input to these fields 254 specify the marker position in the currently selected marker definition information.

Reference numeral 256 denotes fields used to input a marker orientation in the currently selected marker definition information. Values input to these fields 256 specify the marker orientation in the currently selected marker definition information.

Reference numeral 258 denotes a field used to input a marker size in the currently selected marker definition information. A value input to this field 258 specifies the marker size in the currently selected marker definition information. In this embodiment, assume that the marker size input to the field 258 is reflected in the marker definition information of all markers.

Reference numeral 259 denotes a pull-down menu used to edit the reference marker flag included in the marker state in the currently selected marker definition information. This pull-down menu includes "reference marker" and "relative marker" items, and the operator can select one of these items. When the operator selects "reference marker", the reference marker flag is set to be "1"; when he or she selects "relative marker", the reference marker flag is set to be "0".

In this embodiment, however, assume that the marker definition information can include only one reference marker. Therefore, if the marker definition information set with the reference marker flag="1" has already been stored, the operator can only select "relative marker" even when he or she manipulates other pieces of marker definition information.

Reference numeral 251 denotes an "OK" button. When the operator designates this button, the CPU 3001 executes processing for updating the selected marker definition information by respective pieces of information input to the fields 252 to 259. That is, the CPU 3001 executes processing for updating the marker ID, marker position, orientation, marker size, and reference marker flag in the currently selected marker definition information by respective pieces of information input to the fields 252 to 259. However, when the marker ID input to the field 252 is used in the identical file, the CPU 3001 displays an alert on the display screen of the display unit 3005, and skips the update processing of the marker definition information.

The area 230 on the GUI in FIG. 6 will be described below. In the area 230, the CPU 3001 makes a display according to the marker definition information of each of markers described in the currently opened marker definition file. More specifically, the CPU 3001 makes a display according to marker definition information for each marker per row.

Reference numeral 231 denotes a slider bar. Upon designating an upper or lower part of the slider bar, the operator can scroll information displayed in the area 230 upward or downward.

Reference numeral 232 denotes a check box which is used to set a target flag in the corresponding marker definition information. When the operator checks this check box (a check mark is displayed within the check box), the target flag=1 is set; when he or she unchecks the check box (a check mark is cleared from the check box), the target flag=0 is set. For example, when the operator designates the check box in a row of "ID 2" (marker ID=2), the CPU 3001 displays a check mark in the check box. In addition, the CPU 3001 sets the target flag of the marker with the marker ID=2 to be "1". Furthermore, when the operator designates the check box in the row of "ID 2" again, the CPU 3001 clears the check mark from the check box, and sets the target flag of the marker with the marker ID=2 to be "0". In this way, the operator can arbitrarily set a target flag for each marker. This means that the operator of this computer can arbitrarily select markers serving as position and orientation calculation targets. Even when the target flag is manipulated by arbitrary processing in addition to the operation for the check box, this manipulation result is reflected on the check mark in the check box.

Reference numeral 234 denotes a field for displaying the completion status in the corresponding marker definition information as an icon. When the position and orientation calculations of the corresponding marker are complete, the completion status=1 is set. In this case, an icon "⊙" is displayed in the field 234. When the position and orientation calculations of the corresponding marker have failed, the completion status=2 is set. In this case, an icon "x" is displayed in the field 234. When the position and orientation calculation of the corresponding marker have not been executed yet, the completion status=0 is set. In this case, no icon is displayed in the field 234. In FIG. 6, since the icon "⊙" is displayed in the field 234 in the row of "ID 2", the operator can determine that the position and orientation calculations are complete. On the other hand, since no icon is displayed in the field 234 in a row of a marker of "ID 1", the operator can determine that the position and orientation calculations have not been executed yet. Of course, icons to be displayed depending on the completion status values are not particularly limited, and any other kinds of information may be displayed as long as the operator can visually understand the completion status value.

Reference numeral 236 denotes a field for displaying the detection flag in the corresponding marker definition information as an icon. When the corresponding marker is detected from an image, the detection flag=1 is set. In this case, a camera icon is displayed in the field 236. When the corresponding marker is not detected from an image, the detection flag=0 is set. In this case, no icon is displayed in the field 236. In FIG. 6, since the camera icon is displayed in the field 236 in the row of the marker of "ID 2", the operator can determine that the marker is detected from an image. On the other hand, since no icon is displayed in the field of the row of the marker of "ID 1", the operator can determine that the marker is not detected from an image. Of course, icons to be displayed depending on the detection flag values are not particularly limited, and any other kinds of information may be displayed as long as the operator can visually understand the detection flag value.

Reference numeral 238 denotes a field for displaying the marker ID in the corresponding marker definition information. In case of a reference marker, the underlined marker ID is displayed. In FIG. 6, since the marker ID "ID 2" is underlined, the operator can determine that this marker is a reference marker. Of course, the present invention is not limited to an underline to be displayed according to the reference marker flag value, and any other kinds of information may be displayed as long as the operator can visually recognize the reference marker.

Reference numeral 260 denotes an area for displaying a physical space image. The physical space image to be displayed in this area 260 may be either an image acquired onto the RAM 3002 via the I/F 3007 or that acquired onto the RAM 3002 from the external storage device 3006. Alternatively, the physical space image may be an image obtained by enlarging a selected thumbnail of one or more thumbnails displayed in an area 270 to be described later (either an image obtained by applying enlargement processing to the selected thumbnail or a separately stored source image of the thumbnail may be used). The image to be displayed is that of the physical space on which a plurality of markers are allocated. Also, in the area 260, CGs which represent the IDs and outlines of respective markers are superimposed on the physical space image.

The area 270 is used to display a list of thumbnails of physical space images acquired via the I/F 3007. Reference numeral 272 denotes a slider bar. When the operator designates the left or right end of the slider bar, information displayed in the area 270 can be scrolled to the left or right. When the operator designates one of images displayed in the area 270, a frame is displayed on the selected thumbnail. Then, an enlarged image of the designated image (either an image obtained by applying enlargement processing to the selected thumbnail or a separately stored source image of the thumbnail may be used) is displayed in the area 260, as described above.

Reference numeral 282 denotes a button pressed to input an instruction for making the external storage device 3006 sequentially acquire respective frame images (i.e., a moving image) output from the image capturing device via the I/F 3007 and sequentially displaying the acquired images in the area 260.

Reference numeral 284 denotes a button pressed to input an instruction for generating a thumbnail of one frame acquired via the I/F 3007 at the timing of pressing, and additionally displaying that thumbnail in the area 270. Of course, the acquired frame image is stored in the external storage device 3006. Since the button 284 is pressed to acquire one frame in a moving image, it can be pressed only when the operator designates the button 282 pressed to acquire the moving image. Upon acquiring one frame image, the CPU 3001 executes marker detection processing from this frame image, and describes information associated with detected markers in the currently opened marker definition file. Furthermore, the CPU 3001 updates the display contents in the area 230 in accordance with the marker definition file updated by this processing.

Reference numeral 286 denotes a button pressed to input an instruction for deleting the currently selected thumbnail in the area 270. If this thumbnail to be deleted is generated by reducing an original image, the CPU 3001 also deletes this original image. If the deleted image includes a marker, the CPU 3001 also deletes the information associated with this marker from the currently opened marker definition file. Furthermore, the CPU 3001 updates the display contents in the area 230 in accordance with the marker definition file updated by this processing.

Reference numeral 288 denotes a button pressed to input an instruction for starting the position and orientation calculations of the markers with the target flag=1 in the currently opened marker definition file.

Figure 12A:
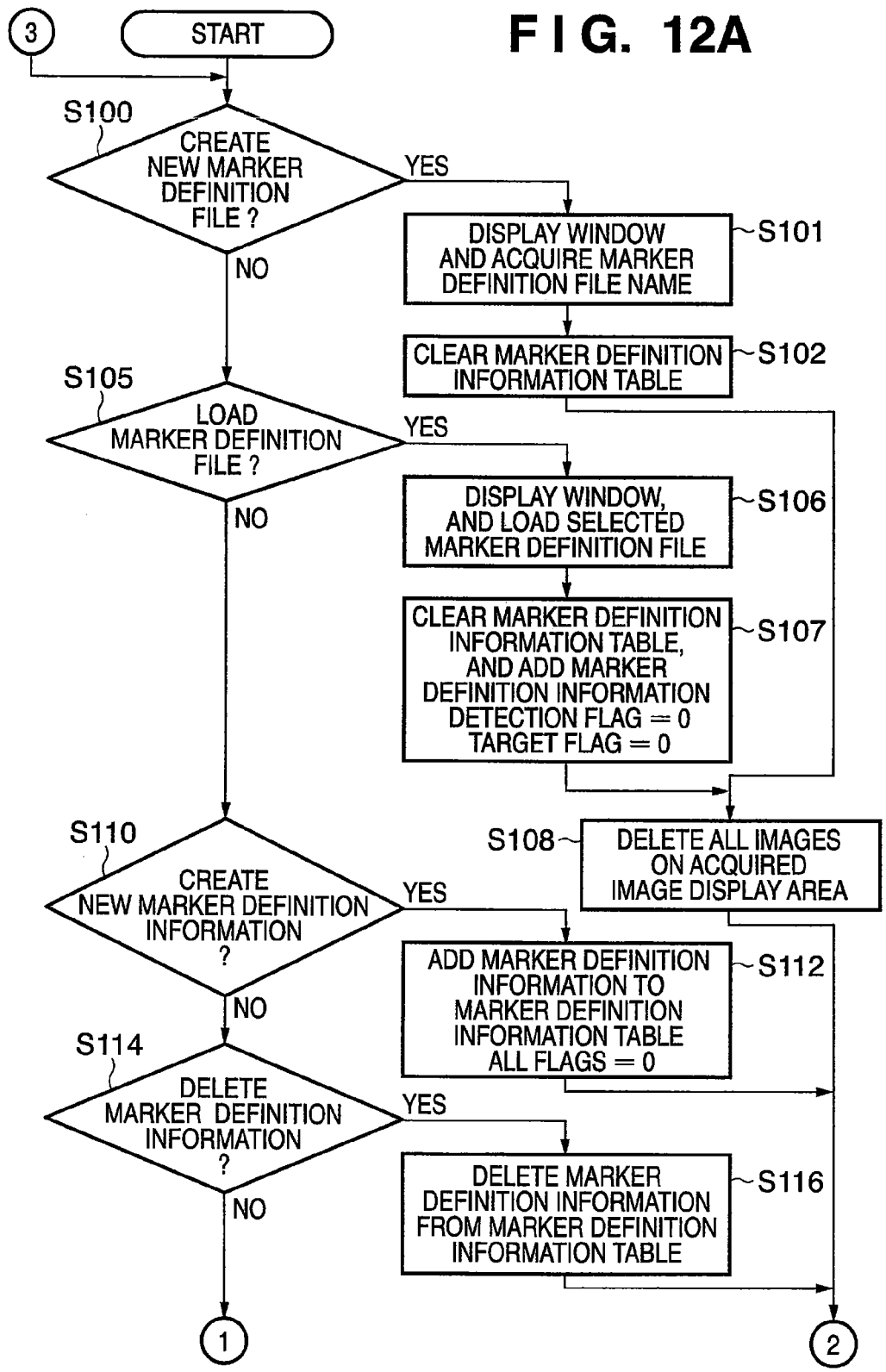
FIGS. 12A and 12B are flowcharts of various processes to be executed using the GUI shown in FIG. 6.
Figure 12B:
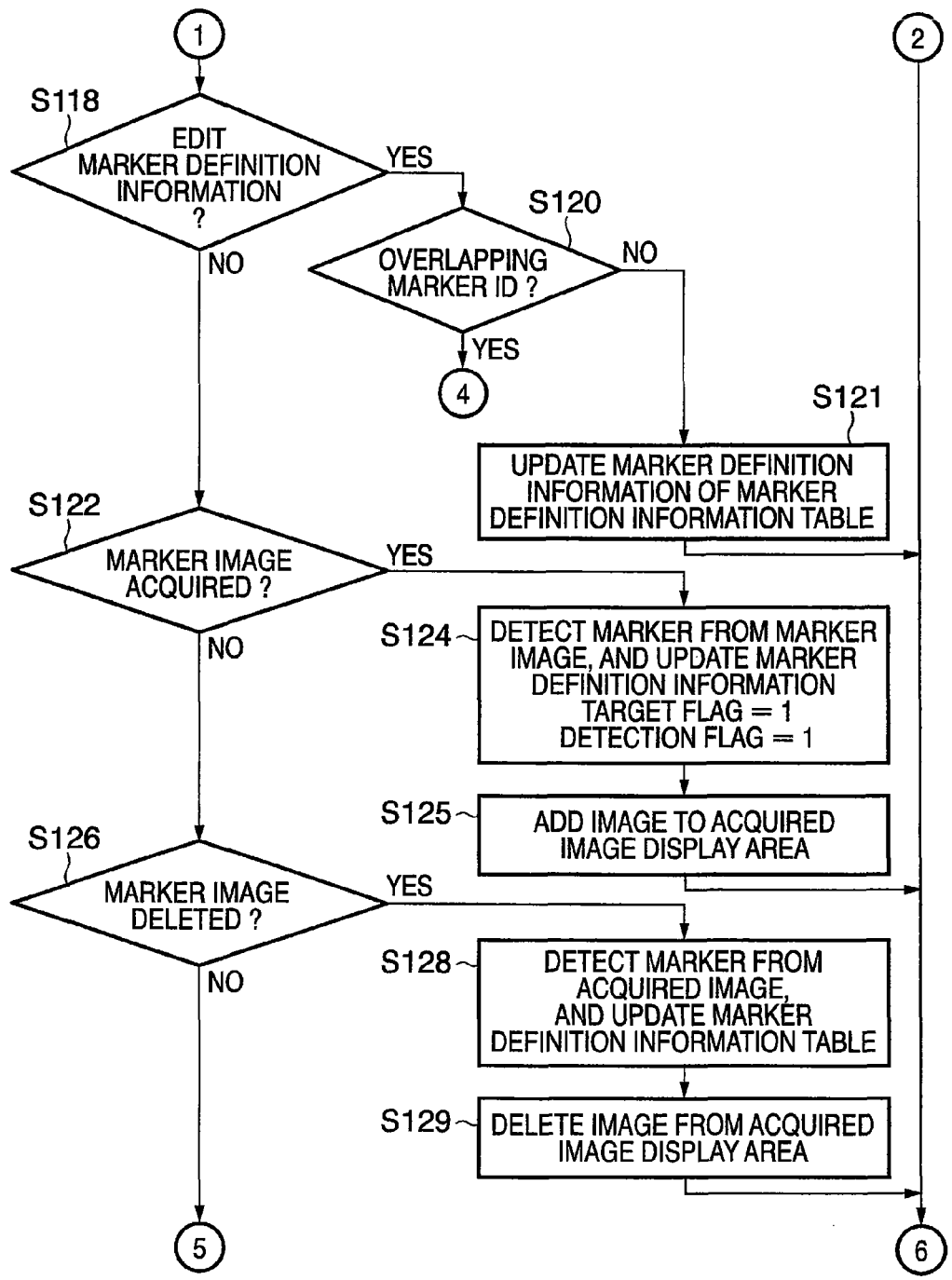
Figure 13:
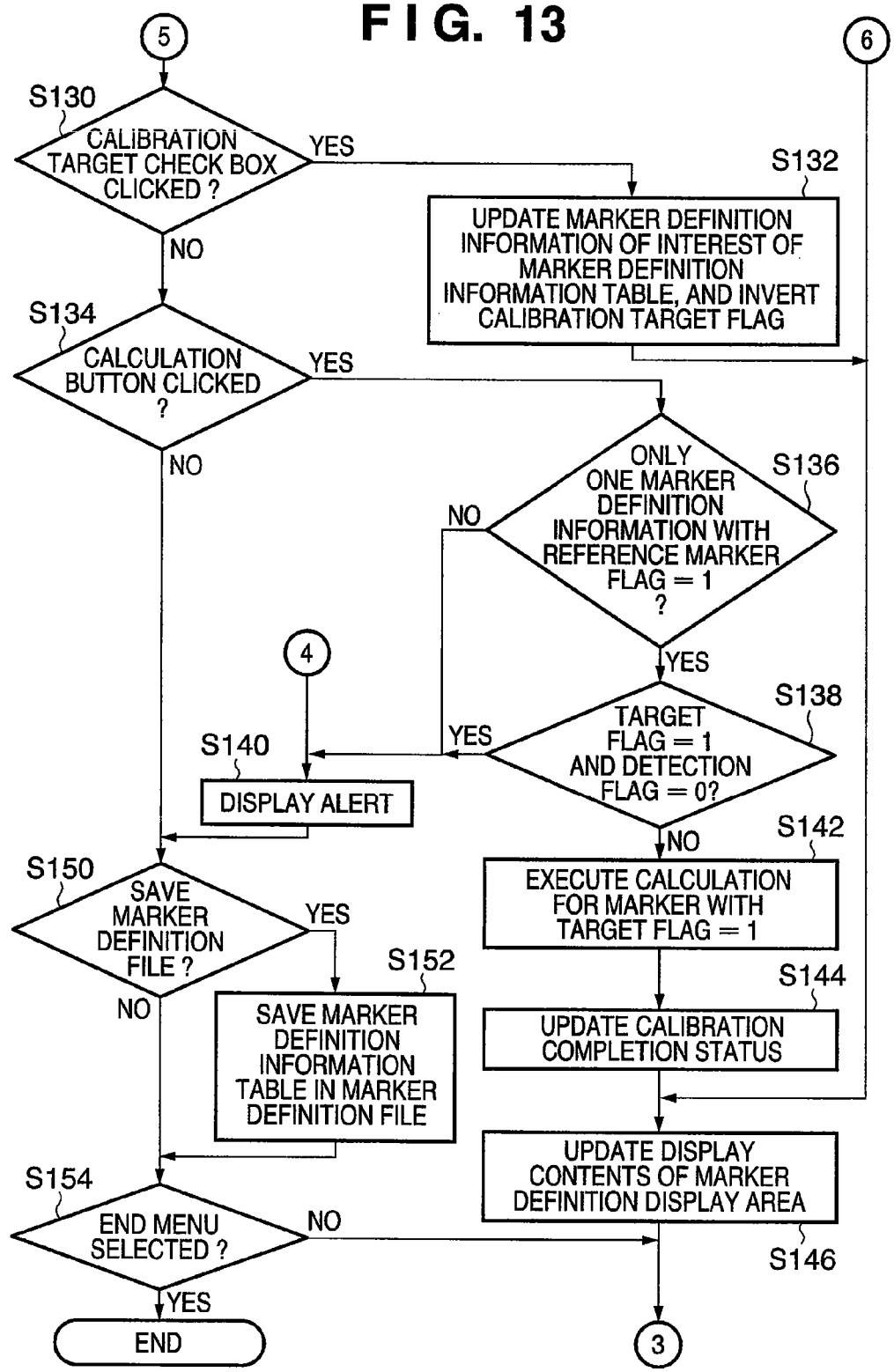
FIG. 13 is a flowchart of various processes to be executed using the GUI shown in FIG. 6.

FIGS. 12A, 12B, and 13 are flowcharts of various processes to be executed using the aforementioned GUI. Note that programs and data for making the CPU 3001 execute the processes according to the flowcharts in FIGS. 12A, 12B, and 13 are saved in the external storage device 3006. These programs and data are loaded onto the RAM 3002 as needed under the control of the CPU 3001. When the CPU 3001 executes the processes using the loaded programs and data, this computer implements respective processes to be described below.

Whether or not to execute the calibration is determined not only by operator's choice but also by the marker state of the marker definition information. Hence, the following description will be given focused on processing for changing the marker definition information from the overall processing.

Prior to execution of the following processing, the programs and data associated with the GUI shown in FIG. 6 have already been loaded onto the RAM 3002 and the CPU 3001 executes the processing using these programs and data. Hence, the GUI in FIG. 6 is already displayed on the display screen of the display unit 3005.

Upon detection of the designation of the "create new marker definition file" menu 214 after detection of the designation of the "file" menu 210 on the GUI in FIG. 6, the process advances to step S101 via step S100. In step S101, the CPU 3001 displays the window shown in FIG. 11 on the display screen of the display unit 3005. The operator of this computer inputs a file name of a new marker definition file to be created in the field 400 of this window. In step S101, the CPU 3001 further acquires the file name input in the field 400. The process advances to step S102 to create a marker definition file having the file name acquired in step S101 in the external storage device 3006. The CPU 3001 sets a marker definition information table having no entries in the created file. The process then advances to step S108, and the CPU 3001 deletes all physical space images already acquired in the external storage device 3006, and updates the display contents in the area (acquired image display area) 270. As a result, nothing is displayed in the area 270. The process jumps to step S146 to update the display contents in the area 230. That is, the area 230 is updated to a state in which nothing is displayed. The process then returns to step S100.

On the other hand, upon detection of the designation of the "open marker definition file" menu 212 after detection of the designation of the "file" menu 210 on the GUI in FIG. 6, the process advances to step S106 via steps S100 and S105. In step S106, the CPU 3001 displays the window shown in FIG. 10 on the display screen of the display unit 3005. The operator of this computer selects one marker definition file on this window. In step S106, the CPU 3001 further loads the selected marker definition file from the external storage device 3006 onto the RAM 3002. The process advances to step S107 to reset the detection flags and target flags of the loaded marker definition information table to zero. The CPU 3001 then executes the processes in steps S108 and S146, and the process returns to step S100.

On the other hand, upon detection of the designation of the "create new marker definition information" menu 222 after detection of the designation of the "edit" menu 220 on the GUI in FIG. 6, the process advances to step S112 via steps S100, S105, and S110. In step S112, the CPU 3001 adds new marker definition information to the currently opened marker definition file. As the marker ID of the added marker definition information, the CPU 3001 assigns a value different from the marker IDs used by the marker definition information stored in the identical file. The CPU 3001 resets all of the reference marker flag, detection flag, target flag, and completion status of the added marker definition information to zero. In addition, the CPU 3001 sets the same marker size as that of the marker definition information stored in the identical file. If another marker definition information is not stored, the CPU 3001 sets a prescribed value. After the CPU 3001 executes the process in step S146, the process returns to step S100.

On the other hand, upon detection of the designation of the "delete marker definition information" menu 224 after detection of the designation of the "edit" menu 220 on the GUI in FIG. 6, the process advances to step S116 via steps S100, S105, S110, and S114. In step S116, the CPU 3001 executes processing for deleting the currently selected marker definition information in the area 230 from the marker definition file. After the CPU 3001 executes the process in step S146, the process returns to step S100.

On the other hand, upon detection of the designation of the "edit marker definition information" menu 226 after detection of the designation of the "edit" menu 220 on the GUI in FIG. 6, the process advances to step S120 via steps S100, S105, S110, S114, and S118. In step S120, the CPU 3001 displays the window shown in FIG. 9 on the display screen of the display unit 3005. The operator of this computer inputs corresponding information to one or more fields of the fields 252 to 259 on this window. If the operator designates the "OK" button 251, the CPU 3001 acquires the information input to the fields 252 to 259 in step S120. The CPU 3001 then checks if the currently opened marker definition file already includes two or more marker IDs which are the same as the marker ID acquired from the field 252.

As a result of this checking, if the file includes two or more marker IDs which are the same as the acquired marker ID, the process advances to step S140, and the CPU 3001 displays an alert on the display screen of the display unit 3005. The process then advances to step S150. The processes in step S150 and subsequent steps will be described later. On the other hand, if the acquired marker ID does not overlap any marker ID, the process advances to step S121, and the CPU 3001 executes processing for updating the currently selected marker definition information in the area 230 to the information acquired in step S120. Then, the CPU 3001 executes the process in step S146. Upon updating the display contents in the area 230 in step S146, the CPU 3001 displays an underline for the marker ID with a reference marker flag=1. After that, the process returns to step S100.

On the other hand, upon detection of the designation of the button 284 while the operator has already designated the button 282 on the GUI in FIG. 6, i.e., while the moving image of the physical space is being acquired in the external storage device 3006 via the I/F 3007, the process advances to step S124 via steps S100, S105, S110, S114, S118, and S122. In step S124, the CPU 3001 detects, from an image acquired in the external storage device 3006 near the designation timing of the button 284, a marker which appears in that image and identifies its marker ID. The CPU 3001 checks if the plurality of pieces of marker definition information of markers registered in the currently opened marker definition file include marker definition information having the same marker ID as that identified from the image. If such marker definition file is found, the CPU 3001 sets both the target flag and detection flag of this marker definition information to be 1. That is, as for the marker detected from the image, the CPU 3001 records information indicating that the marker is detected from the image, and is set as a position and orientation calculation target in the marker definition information of this marker.

On the other hand, if it is determined in step S124 that the plurality of pieces of marker definition information of markers registered in the currently opened marker definition file do not include any marker definition information having the same marker ID as that identified from the image, the CPU 3001 creates marker definition information of this detected marker, and additionally registers the created information in the currently opened marker definition file. In this case, the CPU 3001 assigns the marker ID identified from the image, and sets both the target flag and detection flag to be 1.

The process advances to step S125, and the CPU 3001 additionally displays, in the area 270, a thumbnail of the image acquired in the external storage device 3006 near the designation timing of the button 284. After the CPU 3001 executes the process in step S146, the process returns to step S100.

On the other hand, upon detection of the designation of the button 286 on the GUI in FIG. 6, the process advances to step S128 via steps S100, S105, S110, S114, S118, S122, and S126.

In step S128, the CPU 3001 detects a marker from the original image of the thumbnail selected in the area 270 and the image already acquired in the external storage device 3006, and identifies the marker ID of the detected marker. Subsequently, the CPU 3001 checks if the marker detected from the original image of the thumbnail selected in the area 270 is included in the image already acquired in the external storage device 3006. If that marker is included, the CPU 3001 does nothing; otherwise, it deletes the marker definition information of that marker.

The process then advances to step S129, and the CPU 3001 executes processing for deleting the currently selected thumbnail in the area 270 and its original image from the external storage device 3006. After the CPU 3001 executes the process in step S146, the process returns to step S100.

With these processes, the marker definition information which is no longer detected from the acquired image upon deletion of the image can be automatically deleted from the marker definition information table and can be excluded from the calibration target.

On the other hand, upon detection of the designation for a given check box 232 on the GUI in FIG. 6, the process advances to step S132 via steps S100, S105, S110, S114, S118, S122, S126, and S130. In step S132, the CPU 3001 inverts the target flag in the marker definition information (that having the marker ID displayed in the same row as the designated check box 232) corresponding to the designated check box 232. That is, if the target flag is currently "1", the CPU 3001 inverts it to "0", or vice versa. After the CPU 3001 executes the process in step S146, the process returns to step S100.

On the other hand, upon detection of the designation of the button 288 on the GUI in FIG. 6, the process advances to step S136 via steps S100, S105, S110, S114, S118, S122, S126, S130, and S134.

The CPU 3001 checks in step S136 with reference to the reference marker flags in all the pieces of marker definition information with the target flag=1 registered in the currently opened marker definition file if the file includes two or more pieces of marker definition information with the reference marker flag=1. If the file includes two or more pieces of marker definition information with the reference marker flag=1, the process advances to step S140.

In step S140, the CPU 3001 displays an alert indicating that the calibration cannot be executed because of the presence of two or more reference markers on the display screen of the display unit 3005. The process then advances to step S150. The processes in step S150 and subsequent steps will be described later.

On the other hand, if the file includes only one marker definition information with the reference marker flag=1, the process advances to step S138. The CPU 3001 checks in step S138 if the plurality of pieces of marker definition information registered in the currently opened marker definition file include marker definition information with a target flag=1 and detection flag=0. If such marker definition information is found, the process advances to step S140, and since the position and orientation of such marker cannot be calculated, the CPU 3001 displays an alert that advices accordingly. The process then advances to step S150. The processes in step S150 and subsequent steps will be described later.

On the other hand, if the plurality of pieces of marker definition information registered in the currently opened marker definition file do not include any marker definition information with a target flag=1 and detection flag=0, the process advances to step S142.

In step S142, the CPU 3001 executes the position and orientation calculation processing of each marker corresponding to the marker definition information with a target flag=1 of those registered in the currently opened marker definition file. The process advances to step S144. In step S144, if the position and orientation can be correctly calculated as a result of this calculation processing, the CPU 3001 sets the completion status value in this marker definition information to be "1". If the position and orientation cannot be correctly calculated, the CPU 3001 sets the completion status value to be "2". The CPU 3001 executes the process in step S146, and the process then returns to step S100.

When the aforementioned processes are repeated an arbitrary number of times designated by the operator, and the positions and orientations of all the markers whose positions and orientations the operator wants to obtain can be calculated, the operator designates the "file" menu 210 on the GUI in FIG. 6, and then designates the "save marker definition file" menu 216. Upon detection of this designation, the process advances to step S152 via steps S100, S105, S110, S114, S118, S122, S126, S130, S134, and S150. Even if the process advances from step S140 to step S150, if the designation of the "save marker definition file" menu 216 is detected, the process advances to step S152; otherwise, the process advances to step S154.

In step S152, the CPU 3001 executes processing for saving the currently opened marker definition file in the external storage device 3006. Although a detailed description will not be given in this embodiment, when this marker definition file is loaded, and the registration processing is executed using the marker definition information with the completion status=1, the registration processing using the markers which are selected by the operator to calculate their positions and orientations can be implemented.

The process then advances to step S154. The CPU 3001 checks in step S154 if the operator designates the "end" menu 218. If the "end" menu 218 is not designated, the process returns to step S100. If the "end" menu 218 is designated, the CPU 3001 ends this processing, and then executes the shutdown processing of this computer, as described above.

According to this embodiment as described above, the operator can set markers serving as position and orientation calculation targets, and a reference marker of those detected from the image.

In the aforementioned processing, the CPU 3001 automatically sets markers detected from the image as position and orientation calculation targets in the process in step S124, and the operator of this computer can select position and orientation calculation targets from them (semi-automatically or manually), thus providing a flexible, convenient method.

Furthermore, in addition to the above selection method, the CPU 3001 notifies the operator of the operations required to execute the calibration according to the marker definition information like in the processes in steps S112, S121, S136, and S138. Hence, a load on the setting operations for registration to be executed by the operator can be reduced.

In step S112 as the process executed upon creating new marker definition information, the target flag of the marker to be added is set to be 0. Alternatively, the target flag may be set to be 1 in this step. With this process, the system can guide to execute image acquisition and calibration for a marker, the marker definition information of which is created by the operator, and to use it in the registration processing. This process is effective when the operator wants to manage markers used in registration based on the presence/absence of marker definition information.

In step S124 as the process executed upon image acquisition, the target flag of a marker detected from the marker image is changed to 1. Alternatively, that target flag may be left unchanged. This process is effective when the operator attaches an importance on manual selection of markers to be calibrated.

In step S128 as the process executed upon image deletion, the marker definition information of a marker which is not included in the image is deleted. Alternatively, the detection flag of the marker definition information may be set to be 0. This process is effective when the operator wants to manage marker definition information while leaving that of a marker which has been detected once.

The aforementioned modifications may be selected and set in advance according to operator's favor.

Second Embodiment

In the first embodiment, the positions and orientations of all markers detected from the image or all markers which are selected by the operator from all the detected markers are calculated. However, in this embodiment, the operator captures an image of a marker which is to be excluded from position and orientation calculation targets to positively determine the marker to be excluded from position and orientation calculation targets. Such embodiment is effective when a plurality of apparatuses which execute calibration and registration processing are used in neighboring spaces, and markers used by another apparatus are not used in the calibration and registration processing.

Note that this embodiment is premised on the arrangement according to the first embodiment. However, differences between this embodiment and the first embodiment will be described in detail hereinafter. Therefore, assume that points which are not particularly touched in the following description are the same as the first embodiment.

FIG. 15 shows an example of the configuration of marker definition information according to this embodiment. In this embodiment as well, one marker definition information exists per marker as in the first embodiment. The marker definition information according to this embodiment has a configuration in which an "exclusion flag" is added to the marker state in the marker definition information according to the first embodiment.

The exclusion flag indicates whether or not the marker of interest is to be excluded from the position and orientation calculation processing. If the exclusion flag is "1", that marker is a non-target; if it is "0", the marker is not a non-target. In this embodiment, the prescribed value of the exclusion flag is "0".

FIG. 16 shows a display example of a GUI (graphical user interface) which runs on a computer and is used to calculate the positions and orientations of indices arranged on the physical space. On the GUI shown in FIG. 16, a "mode" menu 240 is added to that shown in FIG. 6. Furthermore, as shown in the fields 236 for marker IDs=7 and 10, an icon "x" that reflects the exclusion flag value is superimposed on their camera icons unlike in the GUI in FIG. 6.

Figure 14:
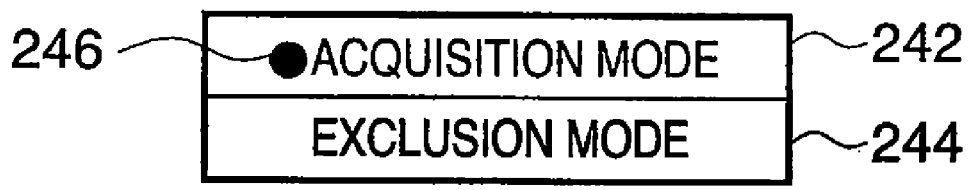
FIG. 14 shows a display example of a mode menu.

Upon designation of the "mode" menu 240 on the GUI shown in FIG. 16, a mode menu shown in FIG. 14 is displayed on the display screen of the display unit 3005. Upon designation of an "acquisition mode" menu 242 on the mode menu shown in FIG. 14, an acquisition mode is set, and a marker detected from an image captured by the image capturing device is set as a position and orientation calculation target. That is, when designating this "acquisition mode" menu 242, if a marker is identified from the image, the exclusion flag of this marker is set to be "0", and the same operations as in the first embodiment are then executed.

On the other hand, upon designation of an "exclusion" mode 244, an exclusion mode is set, and a marker detected from an image captured by the image capturing device is excluded from position and orientation calculation targets. That is, when designating the "exclusion" mode 244, if a marker is identified from the image, the exclusion flag of this marker is set to be "1".

That is, as for a marker detected from an image in the acquisition mode, its detection flag is set to be 1, and its exclusion flag is set to be 0. On the other hand, as for a marker detected from an image in the exclusion mode, its detection flag is set to be 1, and its exclusion flag is set to be 1.

In the field 236, the icon according to the detection flag value is displayed as in the first embodiment. In addition, in this embodiment, an icon according to the exclusion flag value is superimposed. In FIG. 16, icons "x" are displayed in the fields 236 corresponding to marker IDs=7 and 10, and they indicate that the exclusion flags corresponding to the marker IDs=7 and 10 are 1. If the exclusion flag=0, no icon "x" is displayed in the field 236. Of course, an icon to be displayed depending on the exclusion flag value is not particularly limited, and any other kinds of information may be displayed as long as the operator can visually recognize the exclusion flag value.

Figure 17A:
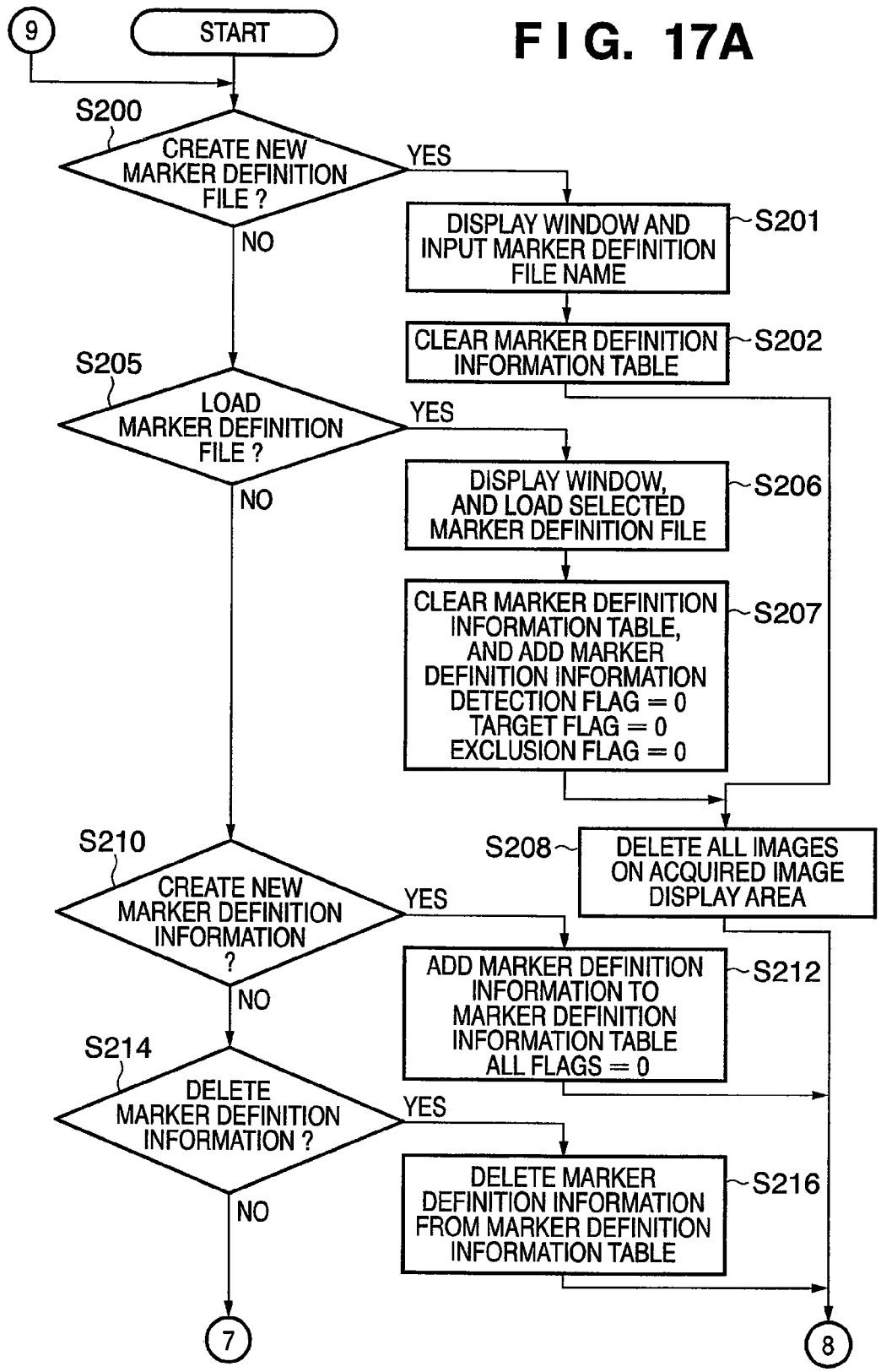
FIGS. 17A and 17B are flowcharts of various processes to be executed using the GUI shown in FIG. 16.
Figure 17B:
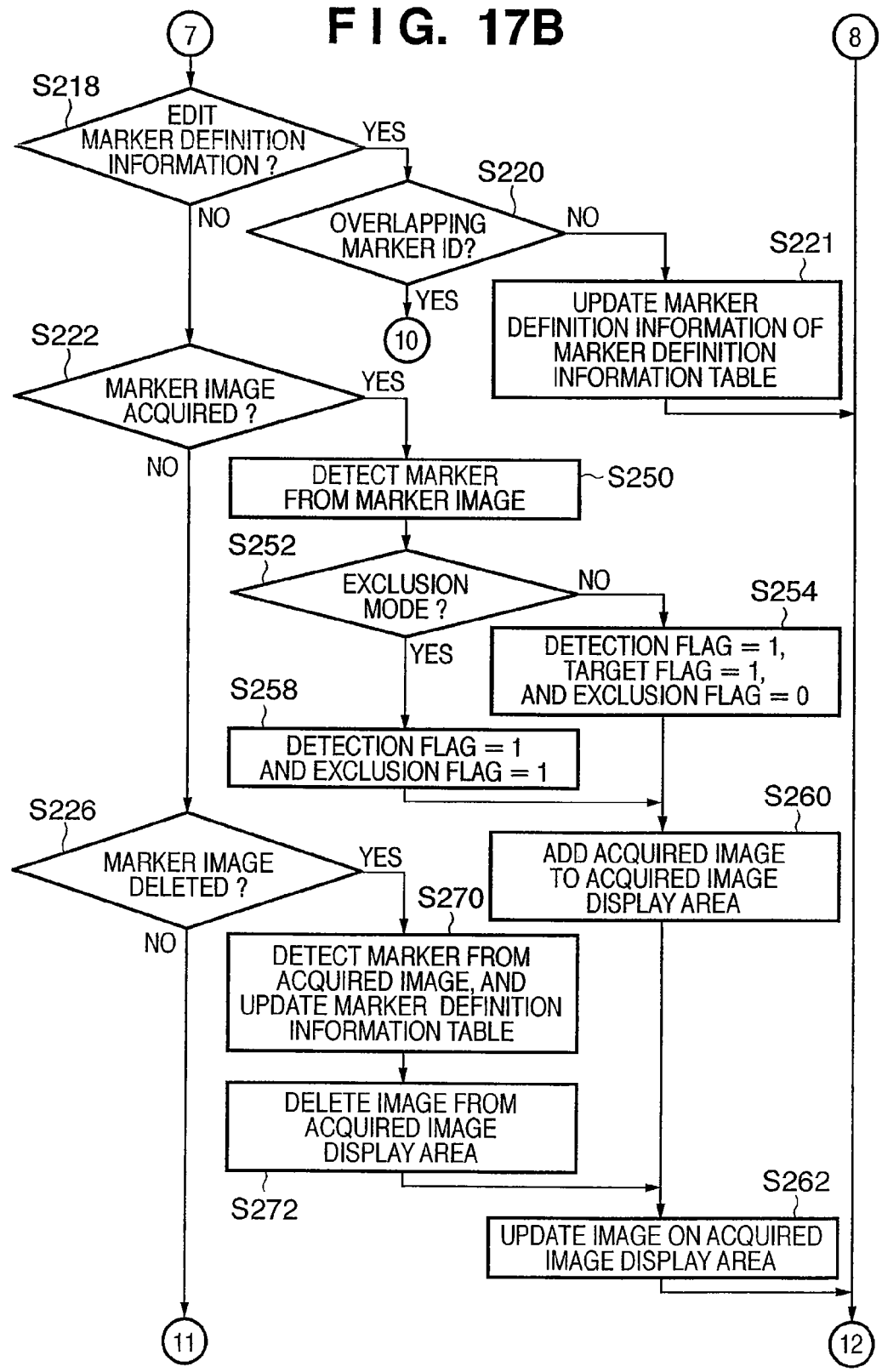
Figure 18:
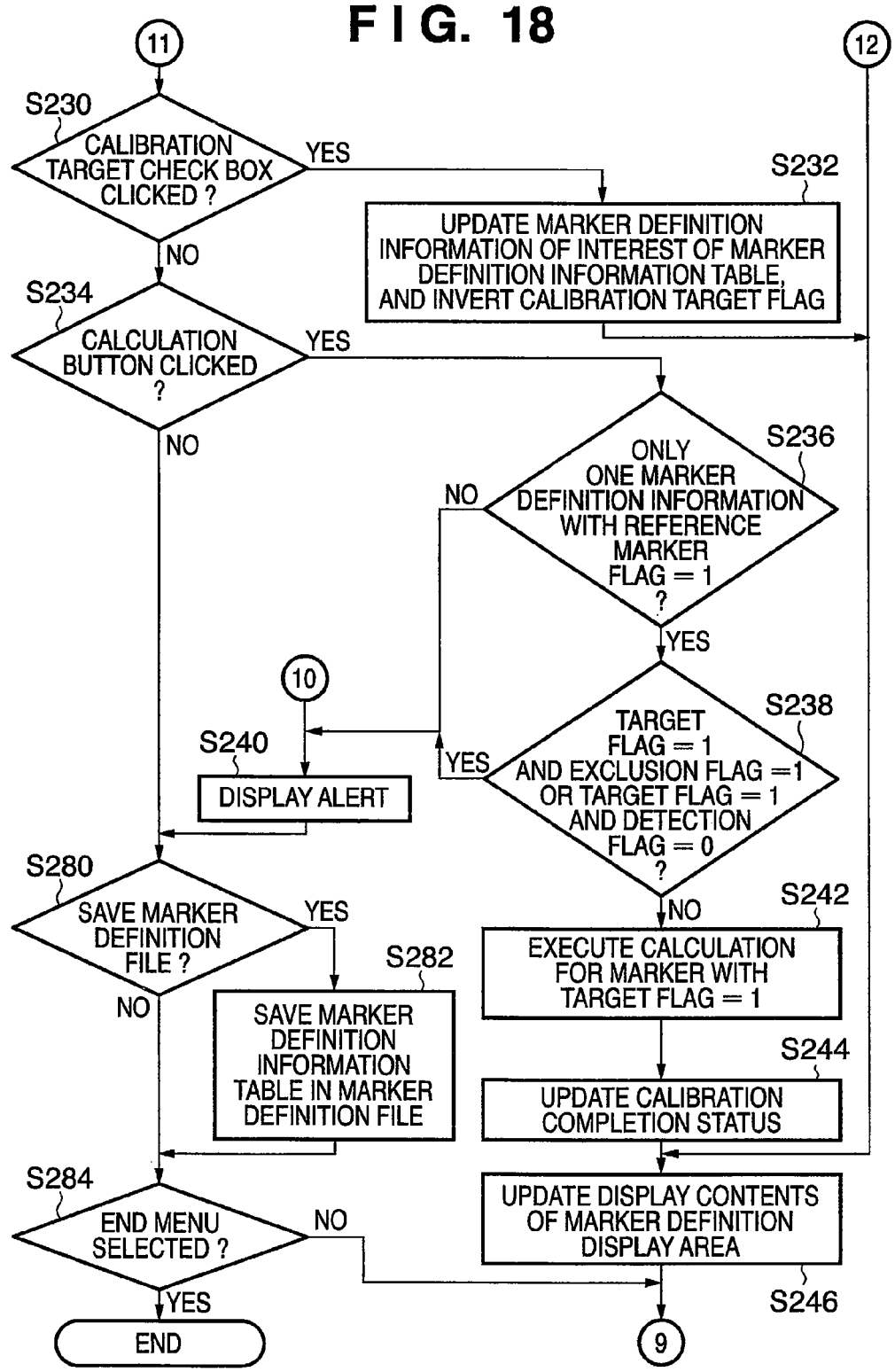
FIG. 18 is a flowchart of various processes to be executed using the GUI shown in FIG. 16.

FIGS. 17A, 17B, and 18 are flowcharts of various processes to be executed using the GUI shown in FIG. 16. The processes (steps S200, S201, S202, S208, and S246) to be executed upon detection of the designation of the "create new marker definition file" menu 214 after detection of the designation of the "file" menu 210 on the GUI in FIG. 16 are respectively the same as those in steps S100, S101, S102, and S108 in FIG. 12A, and step S146 in FIG. 13, and a repetitive description thereof will be avoided.

Also, the processes (steps S205, S206, S207, S208, and S246) to be executed upon detection of the "open marker definition file" menu 212 after detection of the designation of the "file" menu 210 on the GUI in FIG. 16 are respectively the same as those in steps S105, S106, S107, and S108 in FIG. 12A, and step S146 in FIG. 13. In step S207, the CPU 3001 resets the exclusion flag to 0 in addition to the detection flag and target flag.

Upon detection of the designation of the "create new marker definition information" menu 222 after detection of the designation of the "edit" menu 220 on the GUI in FIG. 16, the process advances to step S212 via steps S200, S205, and S210. In step S212, the CPU 3001 adds new marker definition information to the currently opened marker definition file. As the marker ID of the added marker definition information, the CPU 3001 assigns a value different from the marker IDs used by the marker definition information stored in the identical file. The CPU 3001 resets all of the reference marker flag, detection flag, target flag, exclusion flag, and completion status of the added marker definition information to zero. In addition, the CPU 3001 sets the same marker size as that of the marker definition information stored in the identical file. If no other marker definition information is stored, the CPU 3001 sets a prescribed value. After the CPU 3001 executes the process in step S246, the process returns to step S200.

The processes (steps S214, S216, and S246) to be executed upon detection of the designation of the "delete marker definition information" menu 224 after detection of the designation of the "edit" menu 220 on the GUI in FIG. 16 are respectively the same as those in steps S114 and S116 in FIG. 12A, and step S146 in FIG. 13, and a repetitive description thereof will be avoided.

The processes (steps S218, S220, S221, S246, and S240) to be executed upon detection of the designation of the "edit marker definition information" menu 226 after detection of the designation of the "edit" menu 220 on the GUI in FIG. 16 are respectively the same as those in steps S118, S120, and S121 in FIG. 12B, and steps S146 and S140 in FIG. 13, and a repetitive description thereof will be avoided.

Upon detection of the designation of the button 284 while the operator has already designated the button 282 on the GUI in FIG. 16, i.e., while the moving image of the physical space is being acquired in the external storage device 3006 via the I/F 3007, the process advances to step S250 via steps S200, S205, S210, S214, S218, and S222. In step S250, the CPU 3001 detects, from an image acquired in the external storage device 3006 near the designation timing of the button 284, a marker which appears in that image and identifies its marker ID. The CPU 3001 checks in step S252 if the current mode set using the "mode" menu 240 is the exclusion mode or acquisition mode. As a result of checking, if the current mode is the exclusion mode, the process advances to step S258; if it is acquisition mode, the process advances to step S254.

In step S258, if the plurality of pieces of marker definition information of markers registered in the currently opened marker definition file include marker definition information having the same marker ID as that identified from the image, the CPU 3001 sets both the exclusion flag and detection flag in this marker definition information to be 1. That is, of the marker definition information registered in the currently opened marker definition file, the CPU 3001 records information indicating that the marker detected from the image is excluded from the position and orientation calculation targets, and it is detected from the image, in the marker definition information of this marker.

On the other hand, in step S258, if the plurality of pieces of marker definition information of markers registered in the currently opened marker definition file do not include any marker definition information having the same marker ID as that identified from the image, the CPU 3001 creates marker definition information of this detected marker, and additionally registers that information in the currently opened marker definition file. In this case, the CPU 3001 assigns the marker ID identified from the image, and sets both the exclusion flag and detection flag to be 1. The process then advances to step S260.

In step S254, if the plurality of pieces of marker definition information of markers registered in the currently opened marker definition file include marker definition information having the same marker ID as that identified from the image, the CPU 3001 sets both the target flag and detection flag in this marker definition information to be 1, and sets the exclusion flag to be 0. That is, of the marker definition information registered in the currently opened marker definition file, the CPU 3001 records information indicating that the marker detected from the image is set as a position and orientation calculation target, it is detected from the image, and it is not excluded from the position and orientation calculation targets, in the marker definition information of this marker.

On the other hand, in step S254, if the plurality of pieces of marker definition information of markers registered in the currently opened marker definition file do not include any marker definition information having the same marker ID as that identified from the image, the CPU 3001 creates marker definition information of this detected marker, and additionally registers that information in the currently opened marker definition file. In this case, the CPU 3001 assigns the marker ID identified from the image, sets both the target flag and detection flag to be 1, and sets the exclusion flag to be 0.

The process then advances to step S260, and the CPU 3001 additionally displays, in the area 270, a thumbnail of the image acquired in the external storage device 3006 near the designation timing of the button 284. The process advances to step S262. In step S262, the CPU 3001 updates the display contents of the field 236 of each marker in the area 230. As described above, the CPU 3001 displays the icon "x" in the field 236 for the exclusion flag=1. Note that when the exclusion flag=0, the CPU 3001 does not display any icon "x" in the field 236. After the CPU 3001 executes the process in step S246, the process returns to step S200.

With the above processing, a marker detected from an image acquired in the acquisition mode is automatically set as a calibration target, and that detected from an image acquired in the exclusion mode can be automatically excluded from the calibration.

Upon detection of the designation of the button 286 on the GUI in FIG. 16, the process advances to step S270 via steps S200, S205, S210, S214, S218, S222, and S226. In step S270, the CPU 3001 detects a marker from the original image of the thumbnail selected in the area 270 and the image already acquired in the external storage device 3006, and identifies the marker ID of the detected marker. Subsequently, the CPU 3001 checks if the marker detected from the original image of the thumbnail selected in the area 270 is included in the image already acquired in the external storage device 3006. If that marker is included, the CPU 3001 does nothing; otherwise, it deletes the marker definition information of that marker.

The process then advances to step S272, and the CPU 3001 executes processing for deleting the currently selected thumbnail in the area 270 and its original image from the external storage device 3006. After the CPU 3001 executes the processes in steps S262 and S246, the process returns to step S200.

With these processes, the marker definition information which is no longer detected from the acquired image upon deletion of the image can be automatically deleted from the marker definition information table and can be excluded from the calibration target. Also, the icon "x" is displayed for the marker detected from the image acquired in the exclusion mode, thus allowing the operator to understand the excluded marker.

The processes (steps S230, S232, and S246) to be executed upon detection of the designation for a given check box 232 on the GUI in FIG. 16 are the same as those in steps S130, S132, and S146 in FIG. 13, and a repetitive description thereof will be avoided.

On the other hand, upon detection of the designation of the button 288 on the GUI in FIG. 16, the process advances to step S236 via steps S200, S205, S210, S214, S218, S222, S226, S230, and S234. The CPU 3001 checks in step S236 with reference to the reference marker flags in all the pieces of marker definition information with the target flag=1 registered in the currently opened marker definition file if the file includes two or more pieces of marker definition information with the reference marker flag=1. If the file includes two or more pieces of marker definition information with the reference marker flag=1, the process advances to step S240. In step S240, the CPU 3001 displays an alert indicating that the calibration cannot be executed because of the presence of two or more reference markers on the display screen of the display unit 3005. The process then advances to step S280. The processes in step S280 and subsequent steps will be described later.

On the other hand, if the file includes only one marker definition information with the reference marker flag=1, the process advances to step S238. The CPU 3001 checks in step S238 if the plurality of pieces of marker definition information registered in the currently opened marker definition file include marker definition information with a target flag=1 and detection flag=0 or a target flag=1 and exclusion flag=1. If such marker definition information is found, the process advances to step S240, and since the position and orientation of such marker cannot be calculated, the CPU 3001 displays an alert that advices accordingly. The process then advances to step S280. The processes in step S280 and subsequent steps will be described later.

With these processes, failures of the calibration processing can be reduced in advance. Especially, a problem posed when the operator manually changes the target flags can be avoided in advance.

On the other hand, if the plurality of pieces of marker definition information registered in the currently opened marker definition file do not include any marker definition information with a target flag=1 and detection flag=0 or with a target flag=1 and exclusion flag=1, the process advances to step S242. In step S242, the CPU 3001 executes the position and orientation calculation processing of each marker corresponding to the marker definition information with a target flag=1 of those registered in the currently opened marker definition file. The process advances to step S244. In step S244, if the position and orientation can be correctly calculated as a result of this calculation processing, the CPU 3001 sets the completion status value in this marker definition information to be "1". If the position and orientation cannot be correctly calculated, the CPU 3001 sets the completion status value to be "2". The CPU 3001 executes the process in step S246, and the process then returns to step S200.

When the aforementioned processes are repeated an arbitrary number of times designated by the operator, and the positions and orientations of all the markers whose positions and orientations the operator wants to obtain can be calculated, the operator designates the "file" menu 210 on the GUI in FIG. 16, and then designates the "save marker definition file" menu 216. Upon detection of this designation, the process advances to step S282 via steps S200, S205, S210, S214, S218, S222, S226, S230, S234, and S280. Even if the process advances from step S240 to step S280, if the designation of the "save marker definition file" menu 216 is detected, the process advances to step S282; otherwise, the process advances to step S284.

In step S282, the CPU 3001 executes processing for saving the currently opened marker definition file in the external storage device 3006. Although a detailed description will not be given in this embodiment, when this marker definition file is loaded, and the registration processing is executed using the marker definition information with the completion status=1 and exclusion flag=0, the registration processing without using the markers detected from the marker image acquired in the exclusion mode.

The process then advances to step S284. The CPU 3001 checks in step S284 if the operator designates the "end" menu 218. If the "end" menu 218 is not designated, the process returns to step S200. If the "end" menu 218 is designated, the CPU 3001 ends this processing, and then executes the shutdown processing of this computer, as described above.

This embodiment has explained an example in which the image capture operation is done in a special mode, i.e., the exclusion mode to exclude a marker from the calibration. When an image of a marker to be excluded is captured in the exclusion mode, the marker to be excluded from the calibration and registration processing can be designated. Since the operator can change the mode anytime, he or she switches the current mode to the exclusion mode to capture an image of a marker to be excluded, thus easily adding to the marker to be excluded from the calibration.

As in the first embodiment, by changing the values set in the marker state in respective processes, adjustment may be made according to operator's favor or policy. For example, if the exclusion flag is not set to be 0 in step S254, the marker whose image is captured in the exclusion mode once is not set as a position and orientation calculation target. This process is effective when an image of a marker to be excluded is captured in advance, and those of markers to be set as position and orientation calculation targets are then captured.

The aforementioned changes may be selected and set in advance according to operator's favor.

Third Embodiment

In this embodiment, when markers having an identical marker ID are allocated on the physical space, these markers are detected and are excluded from the calibration processing. Note that this embodiment is premised on the arrangement according to the first embodiment. However, differences between this embodiment and the first embodiment will be described in detail hereinafter. Therefore, assume that points which are not particularly touched in the following description are the same as the first embodiment.

A marker used in this embodiment is the same as that in the first embodiment. Assume that marker overlapping detection from an acquired image is implemented by collaboration of the image management unit 106, index management unit 107, index extraction unit 109, and storage unit 110.

FIG. 19 shows an example of the configuration of marker definition information according to this embodiment. In this embodiment as well, one marker definition information exists per marker as in the first embodiment. The marker definition information according to this embodiment has a configuration in which an "overlapping flag" is added to the marker state in the marker definition information according to the first embodiment.

The overlapping flag is set to be "1" when a plurality of markers with an identical marker ID exist on the physical space. The overlapping flag is set to be "0" for a marker which is determined that it does not overlap any other markers. In this embodiment, the prescribed value of the overlapping flag is "0".

FIG. 20 shows a display example of a GUI (graphical user interface) which runs on a computer and is used to calculate the positions and orientations of indices arranged on the physical space. On the GUI shown in FIG. 20, a new field 237 is added to the field 230 on the GUI shown in FIG. 6. The field 237 is used to display an icon indicating that a plurality of corresponding markers exist on the physical space. In FIG. 20, it is detected that a plurality of markers with a marker ID=2 exist on the physical space. That is, when the overlapping flag=1, an icon is displayed; when the overlapping flag=0, no icon is displayed. Of course, an icon to be displayed depending on the overlapping flag value is not particularly limited, and any other kinds of information may be displayed as long as the operator can visually recognize the overlapping flag value.

Figure 22:
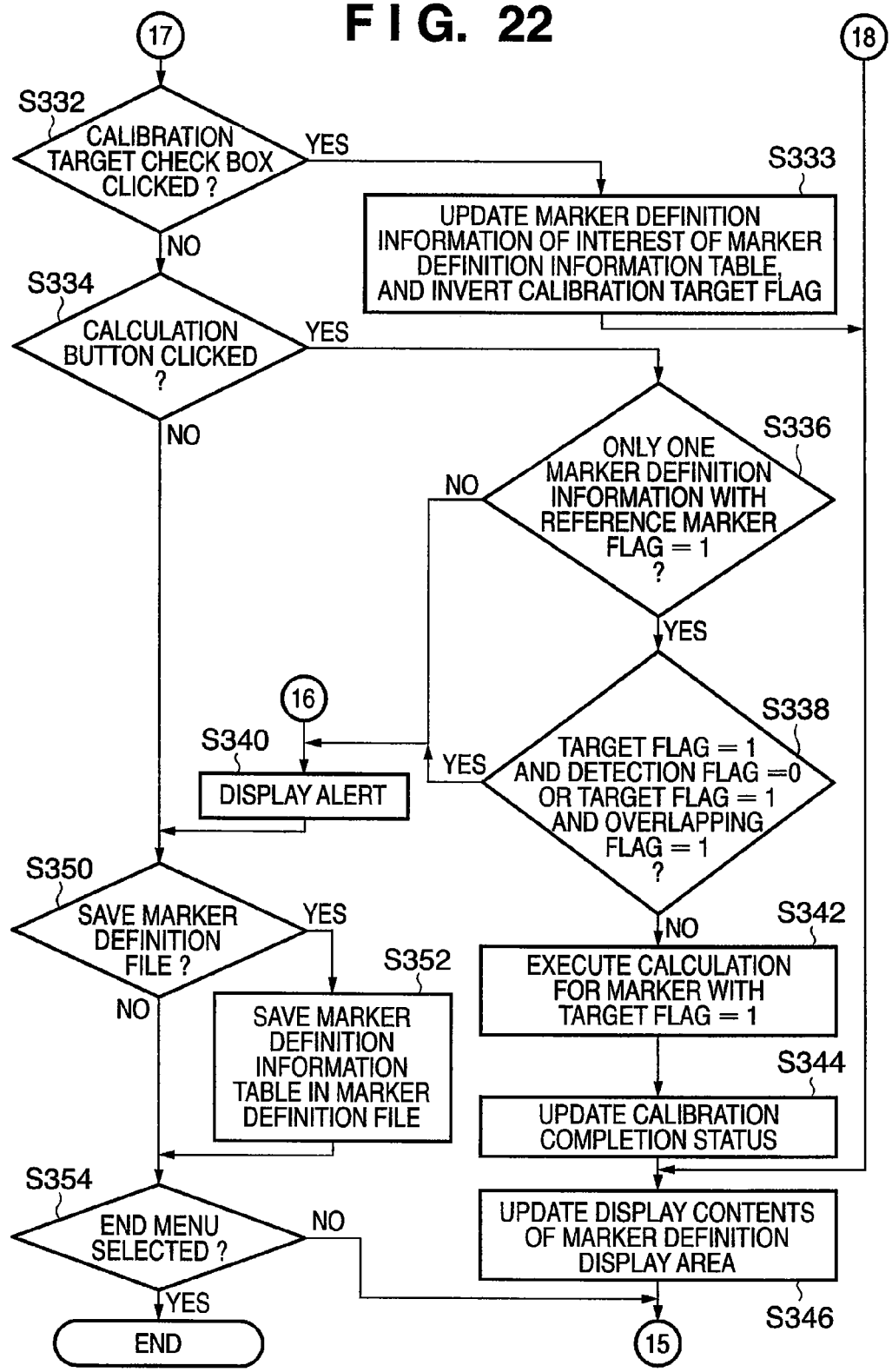
FIG. 22 is a flowchart of various processes to be executed using the GUI shown in FIG. 20.

FIGS. 21A, 21B, and 22 are flowcharts of various processes to be executed using the GUI shown in FIG. 20. The processes (steps S300, S301, S302, S308, and S346) to be executed upon detection of the designation of the "create new marker definition file" menu 214 after detection of the designation of the "file" menu 210 on the GUI in FIG. 20 are respectively the same as those in steps S100, S101, S102, and S108 in FIG. 12A, and step S146 in FIG. 13, and a repetitive description thereof will be avoided.

Also, the processes (steps S305, S306, S307, S308, and S346) to be executed upon detection of the "open marker definition file" menu 212 after detection of the designation of the "file" menu 210 on the GUI in FIG. 20 are respectively the same as those in steps S105, S106, S107, and S108 in FIG. 12A, and step S146 in FIG. 13. In step S307, the CPU 3001 resets the overlapping flag to 0 in addition to the detection flag and target flag.

Upon detection of the designation of the "create new marker definition information" menu 222 after detection of the designation of the "edit" menu 220 on the GUI in FIG. 20, the process advances to step S312 via steps S300, S305, and S310. In step S312, the CPU 3001 adds new marker definition information to the currently opened marker definition file. As the marker ID of the added marker definition information, the CPU 3001 assigns a value different from the marker IDs used by the marker definition information stored in the identical file. The CPU 3001 resets all of the reference marker flag, detection flag, target flag, overlapping flag, and completion status of the added marker definition information to zero. In addition, the CPU 3001 sets the same marker size as that of the marker definition information stored in the identical file. If another marker definition information is not stored, the CPU 3001 sets a prescribed value. After the CPU 3001 executes the process in step S346, the process returns to step S300.

The processes (steps S314, S316, and S346) to be executed upon detection of the designation of the "delete marker definition information" menu 224 after detection of the designation of the "edit" menu 220 on the GUI in FIG. 20 are respectively the same as those in steps S114 and S116 in FIG. 12A, and step S146 in FIG. 13, and a repetitive description thereof will be avoided.

The processes (steps S318, S320, S321, S346, and S340) to be executed upon detection of the designation of the "edit marker definition information" menu 226 after detection of the designation of the "edit" menu 220 on the GUI in FIG. 20 are respectively the same as those in steps S118, S120, and S121 in FIG. 12B, and steps S146 and S140 in FIG. 13, and a repetitive description thereof will be avoided.

Upon detection of the designation of the button 284 while the operator has already designated the button 282 on the GUI in FIG. 20, i.e., while the moving image of the physical space is being acquired in the external storage device 3006 via the I/F 3007, the process advances to step S323 via steps S300, S305, S310, S314, S318, and S322. In step S323, the CPU 3001 detects, from an image acquired in the external storage device 3006 near the designation timing of the button 284, a marker which appears in that image and identifies its marker ID. If the plurality of pieces of marker definition information of markers registered in the currently opened marker definition file include marker definition information having the same marker ID as that identified from the image, the CPU 3001 sets both the target flag and detection flag in this marker definition information to be 1. That is, of the marker definition information registered in the currently opened marker definition file, the CPU 3001 records information indicating that the marker detected from the image is detected from the image, and it is set as a position and orientation calculation target, in the marker definition information of this marker.

On the other hand, in step S323, if the plurality of pieces of marker definition information of markers registered in the currently opened marker definition file do not include any marker definition information having the same marker ID as that identified from the image, the CPU 3001 creates marker definition information of this detected marker, and additionally registers that information in the currently opened marker definition file. In this case, the CPU 3001 assigns the marker ID identified from the image, and sets both the target flag and detection flag to be 1.

Next, the CPU 3001 compares the marker IDs identified from the same image in step S324 to check if two or more identical marker IDs exist, i.e., if two or more markers having the same marker ID exist in one image. As a result of this checking, if two or more markers having the same marker ID are found, the process advances to step S325 to set the overlapping flags in the marker definition information having the overlapping marker ID to be 1. The process then advances to step S326.

On the other hand, as a result of this checking, if two or more markers having the same marker ID do not exist, the process advances to step S326. In step S326, the CPU 3001 additionally displays, in the area 270, a thumbnail of the image acquired in the external storage device 3006 near the designation timing of the button 284. In step S330, the CPU 3001 updates the display contents of the field 237 of each marker in the area 230. As described above, the CPU 3001 displays the icon for the field 237 with the overlapping flag=1. Note that when the overlapping flag=0, the CPU 3001 does not display any icon in the field 237. After the CPU 3001 executes the process in step S346, the process returns to step S300.

With these processes, the automatically detected marker is set as a calibration target and overlapping markers can be excluded from the calibration.

Upon detection of the designation of the button 286 on the GUI in FIG. 20, the process advances to step S328 via steps S300, S305, S310, S314, S318, S322, and S327. In step S328, the CPU 3001 detects a marker from the original image of the thumbnail selected in the area 270 and the image already acquired in the external storage device 3006, and identifies the marker ID of the detected marker. Subsequently, the CPU 3001 checks if the marker detected from the original image of the thumbnail selected in the area 270 is included in the image already acquired in the external storage device 3006. If that marker is included, the CPU 3001 does nothing; otherwise, it deletes the marker definition information of that marker.

The process then advances to step S329, and the CPU 3001 executes processing for deleting the currently selected thumbnail in the area 270 and its original image from the external storage device 3006. After the CPU 3001 executes the processes in steps S330 and S346, the process returns to step S300.

With these processes, the marker definition information which is no longer detected from the acquired image upon deletion of the image can be automatically deleted from the marker definition information table and can be excluded from the calibration target. Also, the icon is displayed for the detected overlapping markers, thus allowing the operator to understand the overlapping markers.

The processes (steps S332, S333, and S346) to be executed upon detection of the designation for a given check box 232 on the GUI in FIG. 20 are the same as those in steps S130, S132, and S146 in FIG. 13, and a repetitive description thereof will be avoided.

On the other hand, upon detection of the designation of the button 288 on the GUI in FIG. 20, the process advances to step S336 via steps S300, S305, S310, S314, S318, S322, S327, S332, and S334.

The CPU 3001 checks in step S336 with reference to the reference marker flags in all the pieces of marker definition information with the target flag=1 registered in the currently opened marker definition file if the file includes two or more pieces of marker definition information with the reference marker flag=1. If the file includes two or more pieces of marker definition information with the reference marker flag=1, the process advances to step S340.

In step S340, the CPU 3001 displays an alert indicating that the calibration cannot be executed because of the presence of two or more reference markers on the display screen of the display unit 3005. The process then advances to step S350. The processes in step S350 and subsequent steps will be described later.

On the other hand, if the file includes only one marker definition information with the reference marker flag=1, the process advances to step S338. The CPU 3001 checks in step S338 if the plurality of pieces of marker definition information registered in the currently opened marker definition file include marker definition information with a target flag=1 and detection flag=0 or a target flag=1 and overlapping flag=1. If such marker definition information is found, the process advances to step S340, and since the position and orientation of such marker cannot be calculated, the CPU 3001 displays an alert that advices accordingly. The process then advances to step S350. The processes in step S350 and subsequent steps will be described later.

With these processes, failures of the calibration processing can be reduced in advance. Especially, a problem posed when the operator manually changes the target flags can be avoided in advance.

On the other hand, if the plurality of pieces of marker definition information registered in the currently opened marker definition file do not include any marker definition information with a target flag=1 and detection flag=0 or with a target flag=1 and overlapping flag=1, the process advances to step S342. In step S342, the CPU 3001 executes the position and orientation calculation processing of each marker corresponding to the marker definition information with a target flag=1 of those registered in the currently opened marker definition file. The process advances to step S344. In step S344, if the position and orientation can be correctly calculated as a result of this calculation processing, the CPU 3001 sets the completion status value in this marker definition information to be "1". If the position and orientation cannot be correctly calculated, the CPU 3001 sets the completion status value to be "2". The CPU 3001 executes the process in step S346, and the process then returns to step S300.

When the aforementioned processes are repeated an arbitrary number of times designated by the operator, and the positions and orientations of all the markers the operator wants to obtain their positions and orientations can be calculated, the operator designates the "file" menu 210 on the GUI in FIG. 20, and then designates the "save marker definition file" menu 216. Upon detection of this designation, the process advances to step S352 via steps S300, S305, S310, S314, S318, S322, S327, S332, S334, and S350. Even if the process advances from step S340 to step S350, if the designation of the "save marker definition file" menu 216 is detected, the process advances to step S352; otherwise, the process advances to step S354.

In step S352, the CPU 3001 executes processing for saving the currently opened marker definition file in the external storage device 3006. Although a detailed description will not be given in this embodiment, when this marker definition file is loaded, and the registration processing is executed using the marker definition information with the completion status=1, the registration processing using the markers which are selected by the operator to calculate their positions and orientations can be implemented.

The process then advances to step S354. The CPU 3001 checks in step S354 if the operator designates the "end" menu 218. If the "end" menu 218 is not designated, the process returns to step S300. If the "end" menu 218 is designated, the CPU 3001 ends this processing, and then executes the shutdown processing of this computer, as described above.

This embodiment has explained an implementation example in which it is detected that two or more markers having the same marker ID are allocated, and these markers are excluded from the calibration. Since the markers which are determined to overlap cannot be used unless the marker definition information is deleted, the probability of calibration failures due to overlapping can be reduced.

As in the first embodiment, by changing the values set in the marker state in respective processes, adjustment may be made according to operator's favor or policy. The aforementioned modifications may be selected and set in advance according to operator's favor.

Fourth Embodiment

In this embodiment, a print function is added to the arrangement according to the first embodiment, and information indicating that a marker has already been printed is used as an element upon selection of a calibration target. This embodiment is effective for the policy where a printing action is to be considered as an intention of the operator to set and calibrate markers.

Note that this embodiment is premised on the arrangement according to the first embodiment. However, differences between this embodiment and the first embodiment will be described in detail hereinafter. Therefore, assume that points which are not particularly touched in the following description are the same as the first embodiment.

Figure 23:
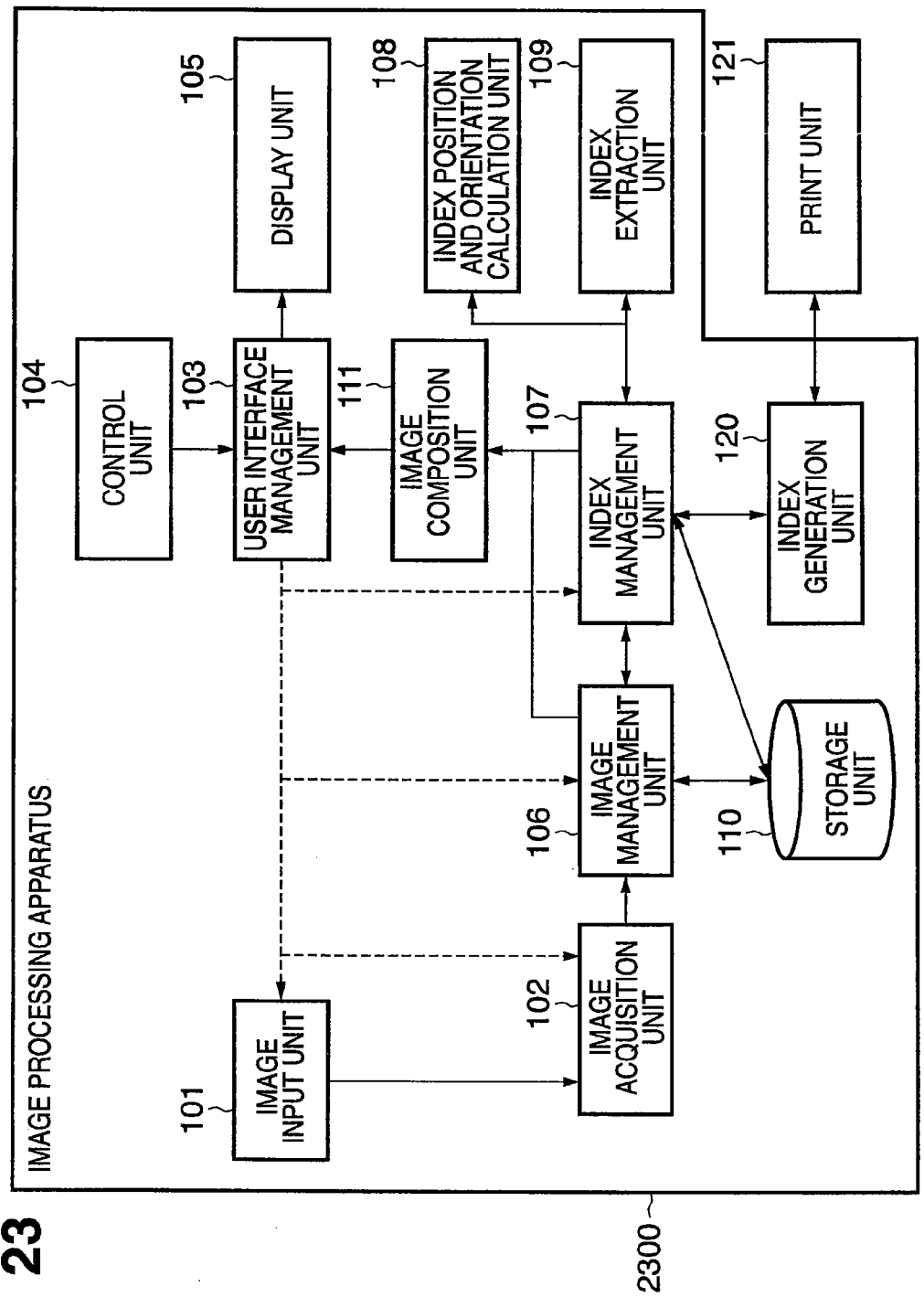
FIG. 23 is a block diagram showing the functional arrangement of an image processing apparatus according to the fourth embodiment of the present invention.

FIG. 23 is a block diagram showing the functional arrangement of an image processing apparatus according to this embodiment. As shown in FIG. 23, an image processing apparatus 2300 according to this embodiment has an arrangement in which an index generation unit 120 is added to the image processing apparatus 100 according to the first embodiment, and a print unit 121 is connected to this index generation unit 120.

The index generation unit 120 receives marker definition information read out by the index management unit 107 from the storage unit 110, and generates a marker image using this marker definition information according to the format shown in FIG. 1. The unit 120 then generates print data based on the generated image. The generated print data is output to the print unit 121. The print unit 121 receives the output print data, and executes processing for printing the print data on a print medium such as a paper sheet or the like. Therefore, a device having a print function such as a printer, multi-function peripheral, or the like is applied to the print unit 121.

In the image processing apparatus 2300, since the operations of the units other than the index generation unit 120 are the same as those in the first embodiment, a repetitive description thereof will be avoided.

FIG. 24 shows an example of the configuration of marker definition information according to this embodiment. In this embodiment as well, one marker definition information exists per marker as in the first embodiment. The marker definition information according to this embodiment has a configuration in which a "print flag" is added to the marker state in the marker definition information according to the first embodiment.

The print flag indicates whether or not a marker of interest is printed by the print unit 121. For a printed marker, its print flag is set to be "1". For a marker which is not printed yet, its print flag is set to be "0". Assume that the index generation unit 120 sets the print flag. For example, when the unit 120 generates print data of a given marker and outputs the generated print data to the print unit 121, it may set the print flag of that marker to be 1. In this embodiment, the prescribed value of the print flag is "0".

Figure 25:
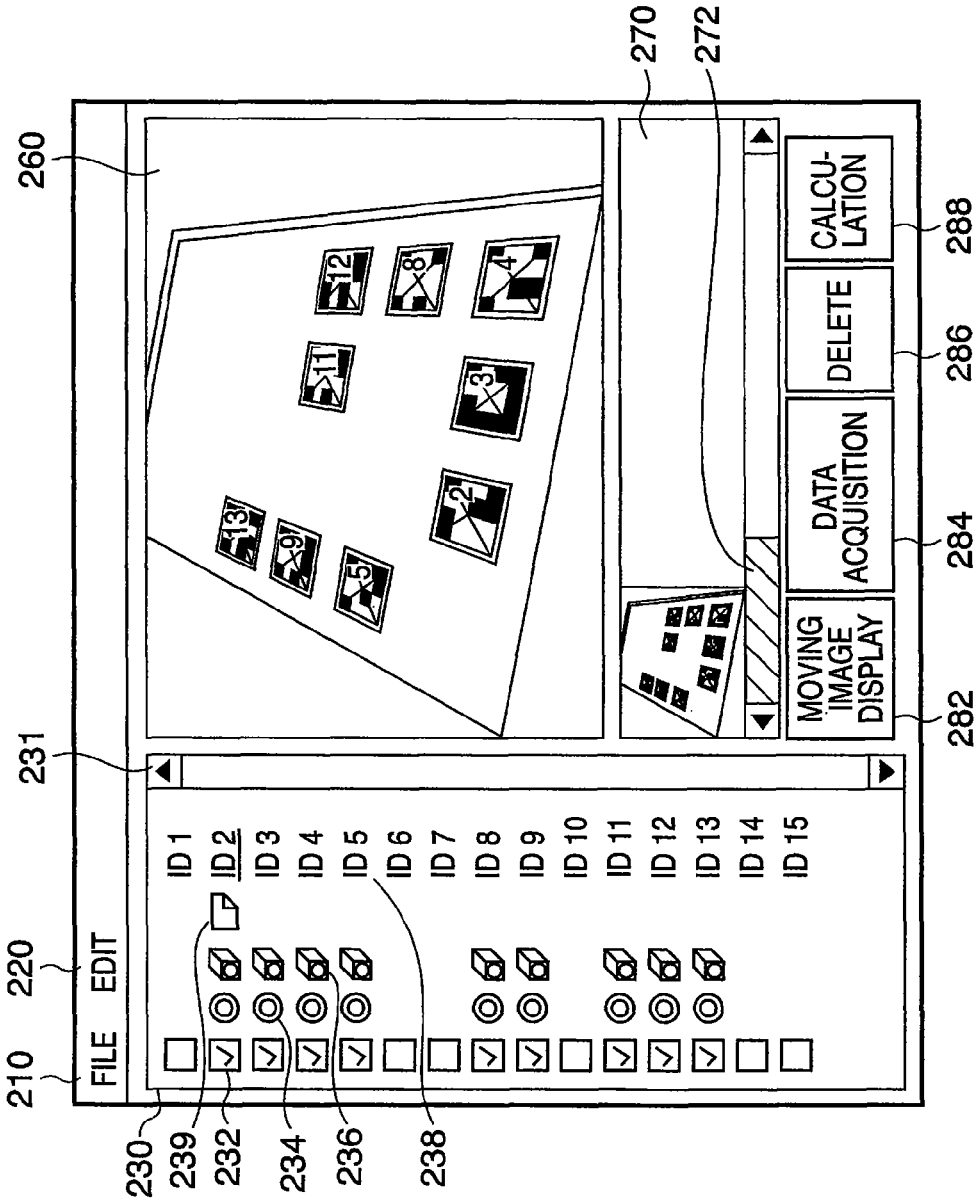
FIG. 25 shows a display example of a GUI (graphical user interface) which runs on a computer and is used to calculate the positions and orientations of indices arranged on the physical space.

FIG. 25 shows a display example of a GUI (graphical user interface) which runs on a computer and is used to calculate the positions and orientations of indices arranged on the physical space. On the GUI shown in FIG. 25, a new field 239 is added to the field 230 on the GUI shown in FIG. 6. The field 239 is used to display an icon indicating that the corresponding marker has already been printed. FIG. 25 shows a state in which a marker with a marker ID=2 has already been printed. That is, if the print flag=1, an icon is displayed; if the print flag=0, no icon is displayed. Of course, an icon to be displayed depending on the print flag value is not particularly limited, and any other kinds of information may be displayed as long as the operator can visually recognize the print flag value.

Figure 26:
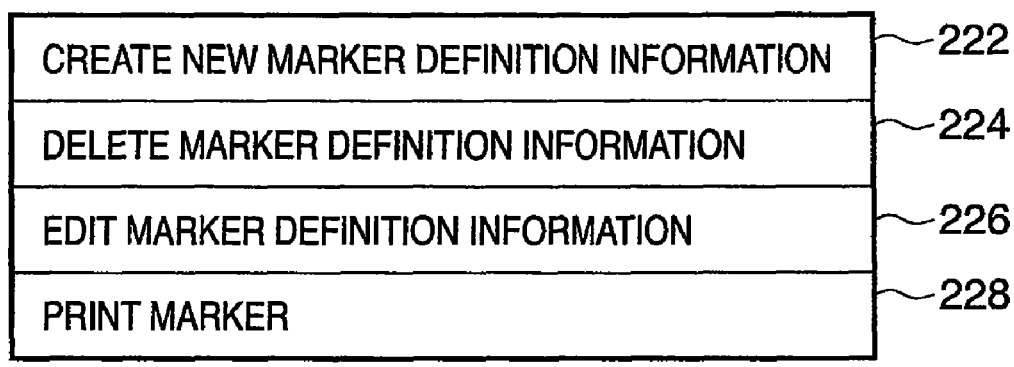
FIG. 26 shows a display example of an edit menu.

Upon designation of the "edit" menu 220 on the GUI shown in FIG. 25, an edit menu shown in FIG. 26 is displayed on the display screen of the display unit 3005. In the edit menu shown in FIG. 26, a "print marker" menu 228 is added to the edit menu shown in FIG. 8 according to the first embodiment. Upon designation of the "print marker" menu 228, a window shown in FIG. 27 is displayed on the display screen of the display unit 3005.

Figure 27:
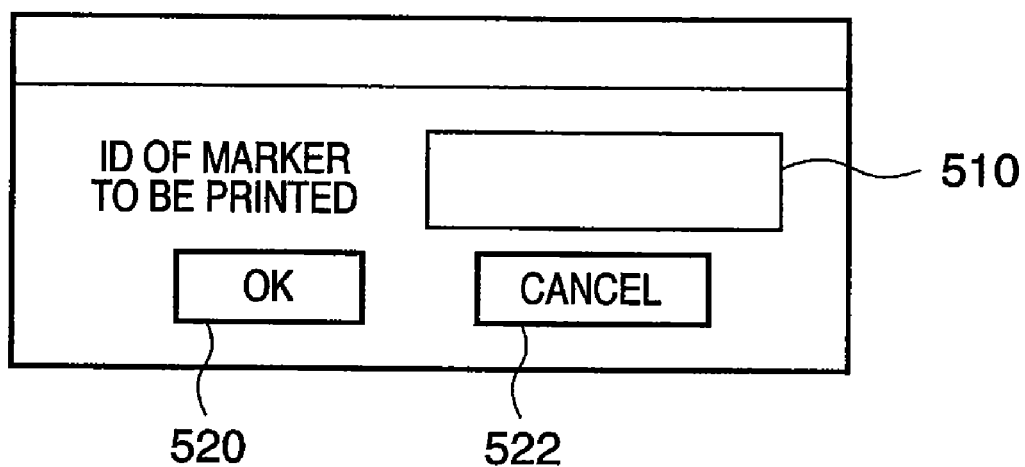
FIG. 27 shows a display example of a window.
Figure 28A:
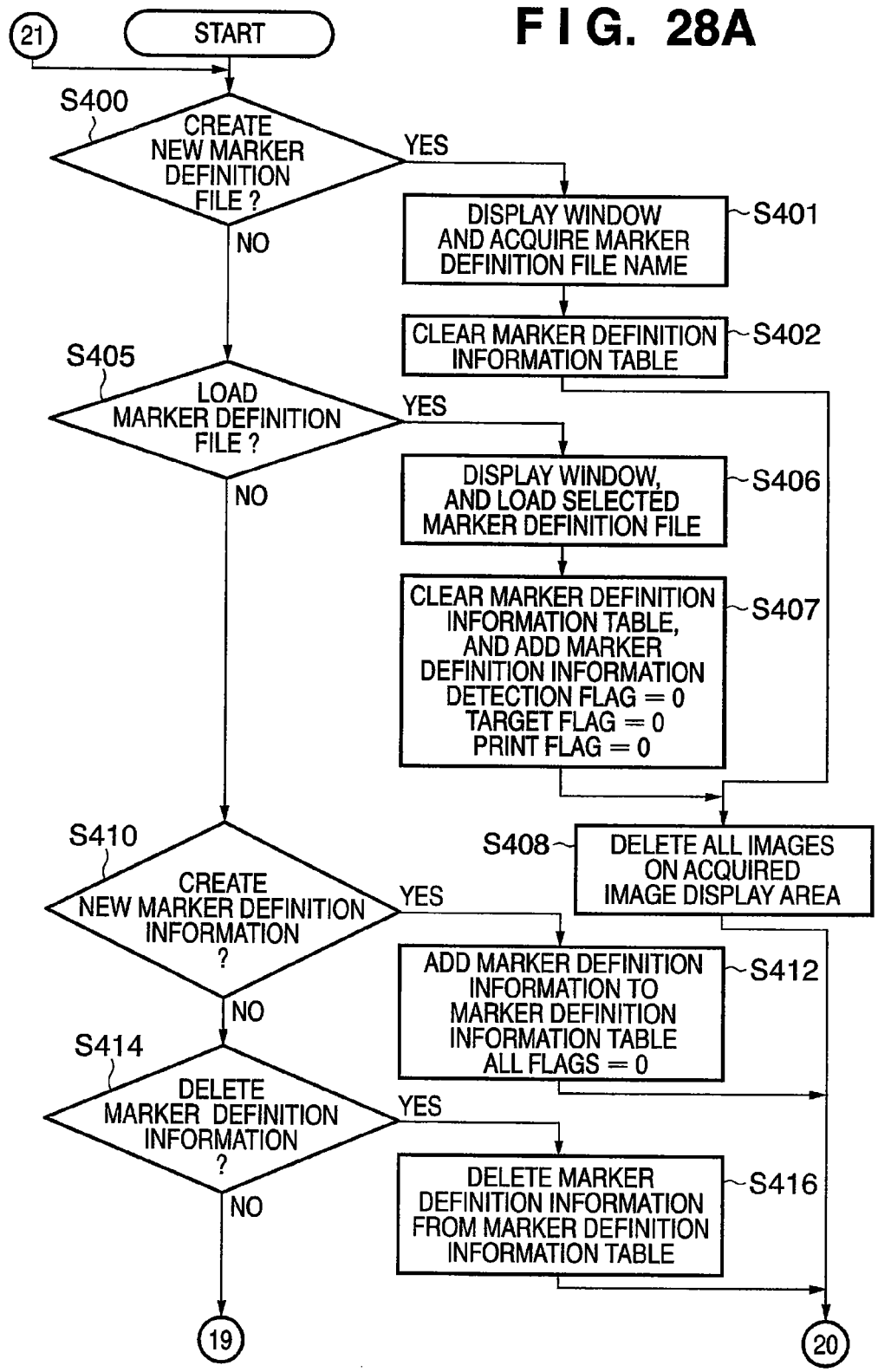
FIGS. 28A and 28B are flowcharts of various processes to be executed using the GUI shown in FIG. 25.
Figure 28B:
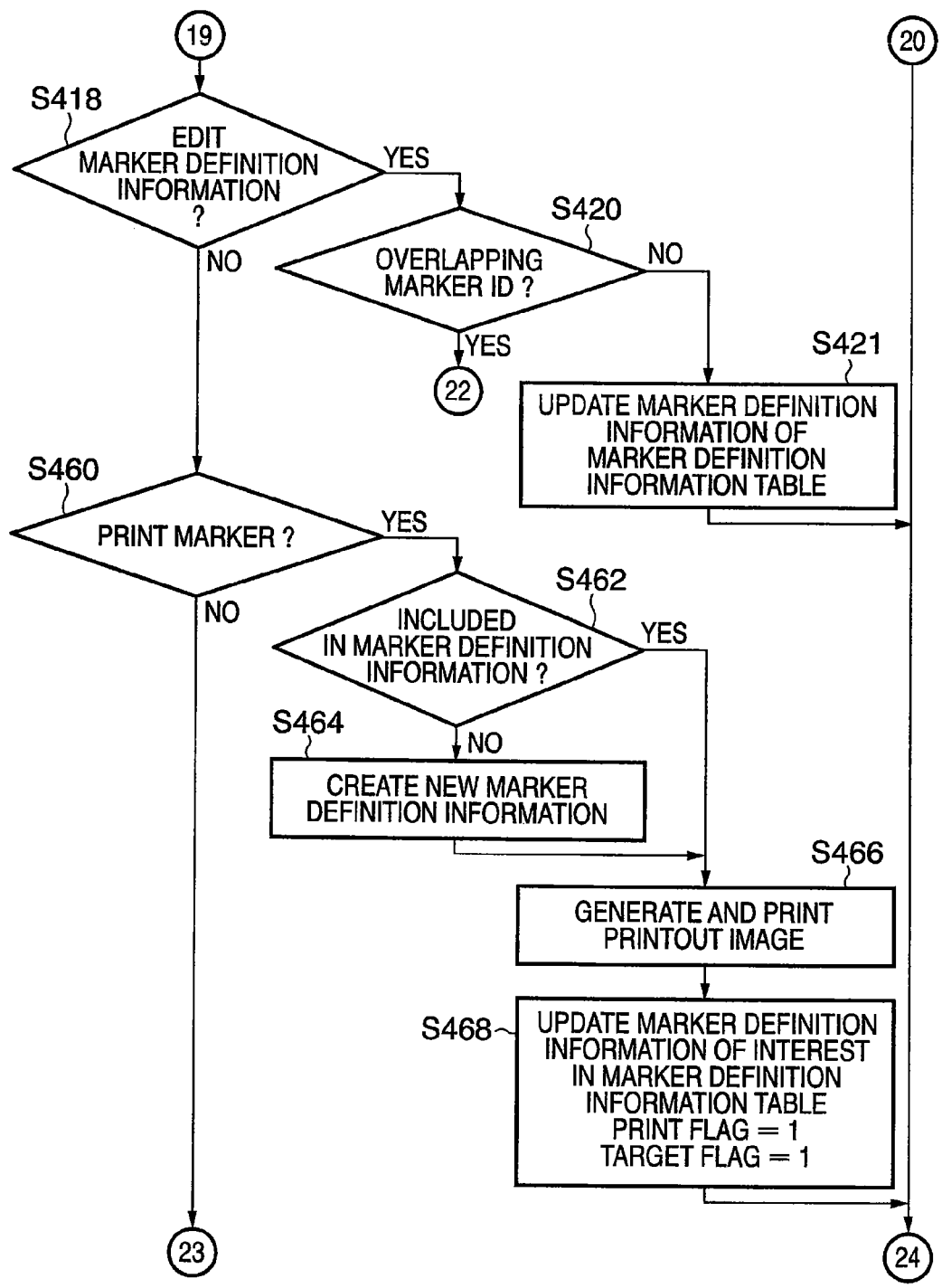
Figure 29A:
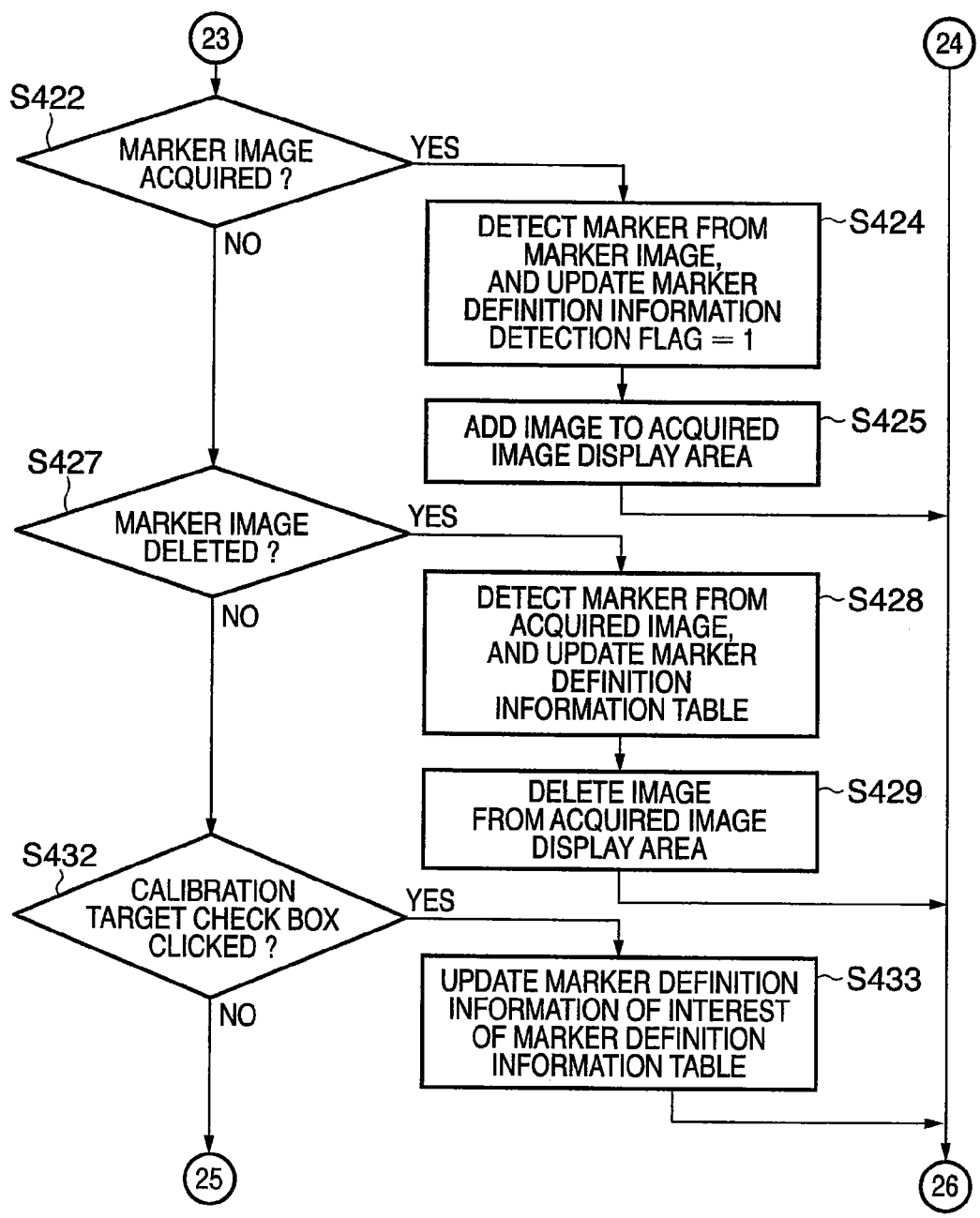
FIGS. 29A and 29B are flowcharts of various processes to be executed using the GUI shown in FIG. 25.
Figure 29B:
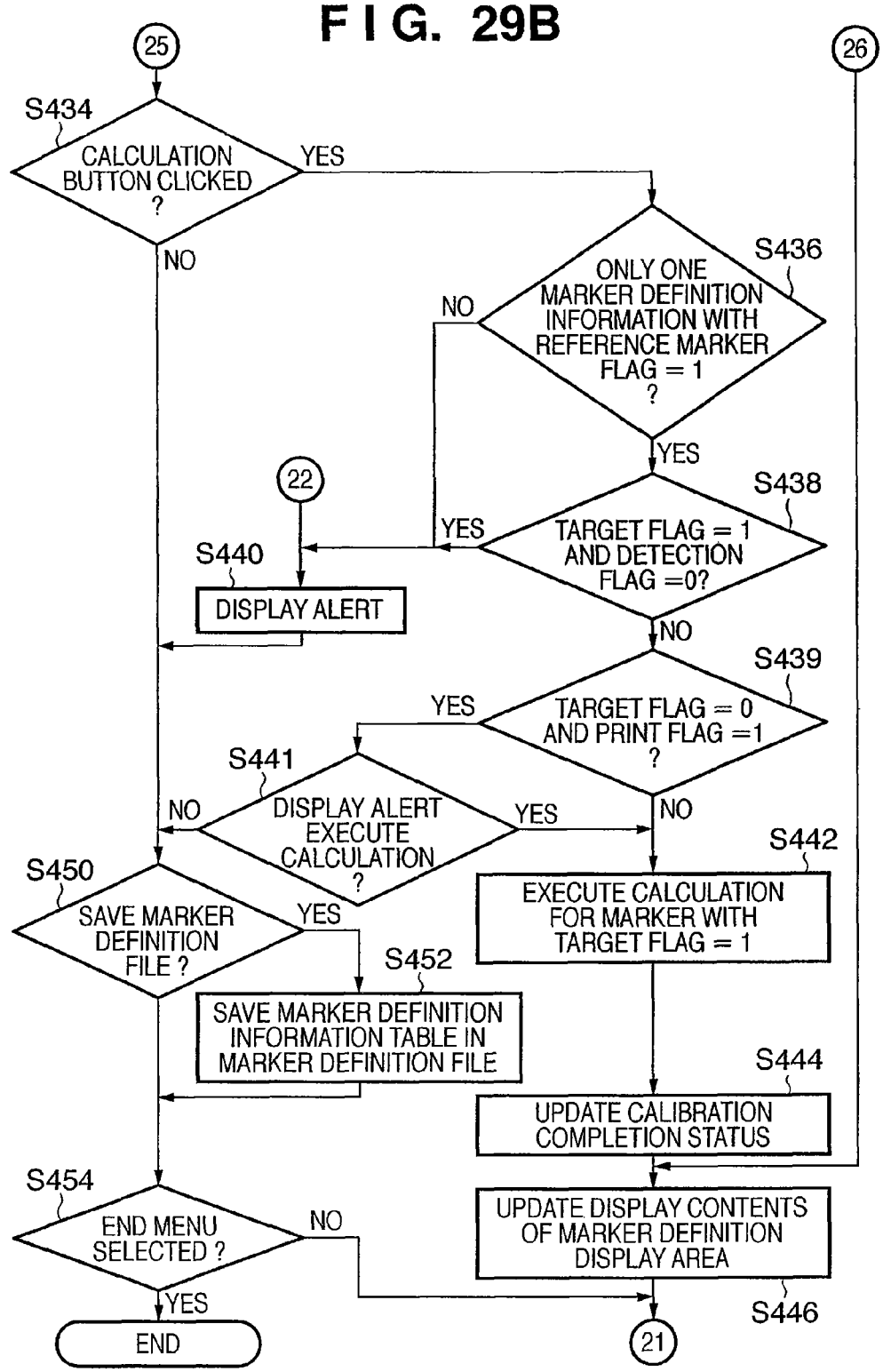

On the window shown in FIG. 27, reference numeral 510 denotes a field used to input the marker ID of a marker to be printed. When the operator of this image processing apparatus 2300 inputs the marker ID of a marker to be printed in this field 510 and then designates an OK button 520, the index management unit 107 and index generation unit 120 generate print data of the marker having the designated marker ID, and the print unit 121 executes print processing according to this print data. In this way, the marker having the designated marker ID is printed on a print medium such as a paper sheet or the like.

Note that an initial value displayed in advance in the field 510 is one of marker IDs displayed in the area 230. However, the initial value may be freely changed within the range of available marker IDs.

FIGS. 28A, 28B, 29A, and 29B are flowcharts of various processes to be executed using the GUI shown in FIG. 25. The processes (steps S400, S401, S402, S408, and S446) to be executed upon detection of the designation of the "create new marker definition file" menu 214 after detection of the designation of the "file" menu 210 on the GUI in FIG. 25 are respectively the same as those in steps S100, S101, S102, and S108 in FIG. 12A, and step S146 in FIG. 13, and a repetitive description thereof will be avoided.

Also, the processes (steps S405, S406, S407, S408, and S446) to be executed upon detection of the "open marker definition file" menu 212 after detection of the designation of the "file" menu 210 on the GUI in FIG. 25 are respectively the same as those in steps S105, S106, S107, and S108 in FIG. 12A, and step S146 in FIG. 13. In step S407, the CPU 3001 resets the print flag to 0 in addition to the detection flag and target flag.

Upon detection of the designation of the "create new marker definition information" menu 222 after detection of the designation of the "edit" menu 220 on the GUI in FIG. 25, the process advances to step S412 via steps S400, S405, and S410. In step S412, the CPU 3001 adds new marker definition information to the currently opened marker definition file. As the marker ID of the added marker definition information, the CPU 3001 assigns a value different from the marker IDs used by the marker definition information stored in the identical file. The CPU 3001 resets all of the reference marker flag, detection flag, target flag, print flag, and completion status of the added marker definition information to zero. In addition, the CPU 3001 sets the same marker size as that of the marker definition information stored in the identical file. If another marker definition information is not stored, the CPU 3001 sets a prescribed value. After the CPU 3001 executes the process in step S446, the process returns to step S400.

The processes (S414, S416, and S446) to be executed upon detection of the designation of the "delete marker definition information" menu 224 after detection of the designation of the "edit" menu 220 on the GUI in FIG. 25 are respectively the same as those in steps S114 and S116 in FIG. 12A, and step S146 in FIG. 13, and a repetitive description thereof will be avoided.

The processes (steps S418, S420, S421, S446, and S440) to be executed upon detection of the designation of the "edit marker definition information" menu 226 after detection of the designation of the "edit" menu 220 on the GUI in FIG. 25 are respectively the same as those in steps S118, S120, and S121 in FIG. 12B, and steps S146 and S140 in FIG. 13, and a repetitive description thereof will be avoided.

Upon detection of the designation of the "print marker" menu 228 after detection of the designation of the "edit" menu 220 on the GUI in FIG. 25, the process advances to step S462 via steps S400, S405, S410, S414, S418, and S460 to display the window shown in FIG. 27 on the display screen of the display unit 3005. The operator of this computer inputs the marker ID of a marker to be printed in the field 510 on this window, and then designates the OK button 520. In step S462, upon detection of the designation of the OK button 520, the CPU 3001 acquires this input marker ID. The CPU 3001 then checks if the acquired marker ID is registered in the currently opened marker definition file (i.e., if it is displayed in the area 230).

As a result of this checking, if that marker ID is not registered, the process advances to step S464. In step S464, the CPU 3001 creates new marker definition information having the acquired marker ID, and additionally registers that information in the currently opened marker definition file. The process in step S464 is executed in the same manner as that in step S412. The process then advances to step S466.

On the other hand, as a result of checking in step S462, if the acquired marker ID is registered, the process advances to step S466, and the CPU 3001 generates print data of an image of this marker based on marker definition information having the marker ID input to the field 510. That is, the CPU 3001 generates an image of the marker that expresses the marker ID in this marker definition information, and then generates print data of that image. The CPU 3001 outputs the generated print data to the print unit 121. In case of this embodiment, since the print unit 121 is connected to the I/F 3007 of this computer, the print data is output to the print unit 121 via this I/F 3007. As a result, the marker having the marker ID input to the field 510 is printed by the print unit 121 on a print medium such as a paper sheet or the like.

When the process advances from step S464 to step S466, the CPU 3001 generates print data of an image of the marker based on the newly created marker definition information in step S466. Then, the CPU 3001 outputs the generated print data to the print unit 121.

The process then advances to step S468, and the CPU 3001 sets both the target flag and print flag in the marker definition information of the printed marker to be 1. After the CPU 3001 executes the process in step S446, the process returns to step S400.

By processing for setting these printed markers to be automatically included in calibration targets, the marker print log can be used as an element upon selection of a marker to be calibrated.

By automatically adding the marker definition information of the printed marker to the marker definition information table, a load on the operations of the operator can be reduced.

Upon detection of the designation of the button 284 while the operator has already designated the button 282 on the GUI in FIG. 25, i.e., while the moving image of the physical space is being acquired in the external storage device 3006 via the I/F 3007, the process advances to step S424 via steps S400, S405, S410, S414, S418, S460, and S422.

In step S424, the CPU 3001 detects, from an image acquired in the external storage device 3006 near the designation timing of the button 284, a marker which appears in that image and identifies its marker ID. If the plurality of pieces of marker definition information of markers registered in the currently opened marker definition file include marker definition information having the same marker ID as that identified from the image, the CPU 3001 sets the detection flag in this marker definition information to be 1. That is, of the marker definition information registered in the currently opened marker definition file, the CPU 3001 records information indicating that the marker detected from the image is detected, in the marker definition information of this marker.

On the other hand, in step S424, if the plurality of pieces of marker definition information of markers registered in the currently opened marker definition file do not include any marker definition information having the same marker ID as that identified from the image, the CPU 3001 creates marker definition information of this detected marker, and additionally registers that information in the currently opened marker definition file. In this case, the CPU 3001 assigns the marker ID identified from the image, and sets the detection flag to be 1.

The process then advances to step S425, and the CPU 3001 additionally displays, in the area 270, a thumbnail of the image acquired in the external storage device 3006 near the designation timing of the button 284. After the CPU 3001 executes the process in step S446, the process returns to step S400.

Upon detection of the designation of the button 286 on the GUI in FIG. 25, the process advances to step S428 via steps S400, S405, S410, S414, S418, S460, S422, and S427.

In step S428, the CPU 3001 detects a marker from the original image of the thumbnail selected in the area 270 and the image already acquired in the external storage device 3006, and identifies the marker ID of the detected marker. Subsequently, the CPU 3001 checks if the marker detected from the original image of the thumbnail selected in the area 270 is included in the image already acquired in the external storage device 3006. If that marker is included, the CPU 3001 does nothing; otherwise, it deletes the marker definition information of that marker.

The process then advances to step S429, and the CPU 3001 executes processing for deleting the currently selected thumbnail in the area 270 and its original image from the external storage device 3006. After the CPU 3001 executes the processes in step S446, the process returns to step S400.

With these processes, the marker definition information which is no longer detected from the acquired image upon deletion of the image can be automatically deleted from the marker definition information table and can be excluded from the calibration target.

The processes (steps S432, S433, and S446) to be executed upon detection of the designation for a given check box 232 on the GUI in FIG. 25 are the same as those in steps S130, S132, and S146 in FIG. 13, and a repetitive description thereof will be avoided.

On the other hand, upon detection of the designation of the button 288 on the GUI in FIG. 25, the process advances to step S436 via steps S400, S405, S410, S414, S418, S460, S422, S427, S432, and S434.

The CPU 3001 checks in step S436 with reference to the reference marker flags in all the pieces of marker definition information with the target flag=1 registered in the currently opened marker definition file if the file includes two or more pieces of marker definition information with the reference marker flag=1. If the file includes two or more pieces of marker definition information with the reference marker flag=1, the process advances to step S440.

In step S440, the CPU 3001 displays an alert indicating that the calibration cannot be executed because of the presence of two or more reference markers on the display screen of the display unit 3005. The process then advances to step S450. The processes in step S450 and subsequent steps will be described later.

On the other hand, if the file includes only one marker definition information with the reference marker flag=1, the process advances to step S438. The CPU 3001 checks in step S438 if the plurality of pieces of marker definition information registered in the currently opened marker definition file include marker definition information with a target flag=1 and detection flag=0. If such marker definition information is found, the process advances to step S440, and since the position and orientation of such marker cannot be calculated, the CPU 3001 displays an alert that advices accordingly. The process then advances to step S450. The processes in step S450 and subsequent steps will be described later.

With these processes, a mistake about a non-detected marker which is set as a calibration target can be avoided, and the CPU 3001 can prompt the operator to acquire an image to detect that marker.

On the other hand, if the plurality of pieces of marker definition information registered in the currently opened marker definition file do not include any marker definition information with a target flag=1 and detection flag=0, the process advances to step S439.

The CPU 3001 checks in step S439 if the plurality of pieces of marker definition information registered in the currently opened marker definition file include marker definition information with a target flag=0 and print flag=1. As a result of this checking, if the file includes such marker definition information, the process advances to step S441.

In step S441, the CPU 3001 determines that it is odd that the marker is printed but is not set as a calibration target, displays an alert on the display screen of the display unit 3005, and also displays a GUI for prompting the operator to decide whether or not to abort the calibration processing again on the display screen of the display unit 3005. With this process, a mistake about a marker which is manually excluded from the calibration target by the operator although that marker is printed and allocated can be avoided, and the CPU 3001 can prompt the operator to calibrate the printed marker.

As a result of an operation on this GUI, if an instruction to abort the calculation is input, the process advances to step S450. On the other hand, if an instruction to continue the calculation is input, the process advances to step S442.

On the other hand, as a result of checking in step S439 above, if the plurality of pieces of marker definition information registered in the currently opened marker definition file do not include any marker definition information with a target flag=0 and print flag=1, the process advances to step S442.

In step S442, the CPU 3001 executes the position and orientation calculation processing of each marker corresponding to the marker definition information with a target flag=1 of those registered in the currently opened marker definition file. The process advances to step S444. In step S444, if the position and orientation can be correctly calculated as a result of this calculation processing, the CPU 3001 sets the completion status value in this marker definition information to be "1". If the position and orientation cannot be correctly calculated, the CPU 3001 sets the completion status value to be "2". The CPU 3001 executes the process in step S446, and the process then returns to step S400.

When the aforementioned processes are repeated an arbitrary number of times designated by the operator, and the positions and orientations of all the markers the operator wants to obtain their positions and orientations can be calculated, the operator designates the "file" menu 210 on the GUI in FIG. 25, and then designates the "save marker definition file" menu 216. Upon detection of this designation, the process advances to step S452 via steps S400, S405, S410, S414, S418, S460, S422, S427, S432, S434, and S450. Even if the process advances from step S440 or S441 to step S450, if the designation of the "save marker definition file" menu 216 is detected, the process advances to step S452; otherwise, the process advances to step S454.

In step S452, the CPU 3001 executes processing for saving the currently opened marker definition file in the external storage device 3006. Although a detailed description will not be given in this embodiment, when this marker definition file is loaded, and the registration processing is executed using the marker definition information with the completion status=1, the registration processing using the markers which are selected by the operator to calculate their positions and orientations can be implemented.

The process then advances to step S454. The CPU 3001 checks in step S454 if the operator designates the "end" menu 218. If the "end" menu 218 is not designated, the process returns to step S400. If the "end" menu 218 is designated, the CPU 3001 ends this processing, and then executes the shutdown processing of this computer, as described above.

This embodiment has explained an example in which the marker print function is added to the first embodiment, and information indicating that the marker has already been printed is used as an element upon selection of a calibration target. According to such arrangement, when printed markers include a marker which is not detected from an image, an alert can be displayed to guide the operator so that the printed markers can be calibrated.

When the operator wants to exclude the printed marker from calibration targets, he or she can implement this by a simple operation to the calibration target check box 232.

By combining the manual selection method by the operator, and automatic addition of the printed marker to the calibration targets when the marker is printed (the process in step S468), a flexible and convenient method can be provided.

Furthermore, in addition to the aforementioned selection method, since the apparatus notifies the operator of operations required to execute the calibration according to the marker definition information like in the processes in steps S436, S438, and S439, a load on the setting operations for registration made by the operator can be reduced.

In step S407 as the process for opening the marker definition file, the print flag of the marker definition information to be loaded is set to be 0. Alternatively, the print flag may be set to be 1 to save a print log. In this way, the operator can manage the print log using the marker definition file.

In step S468 as the marker print process, the target flag of the printed marker is set to be 1. Alternatively, the target flag of the printed marker may be set to be 0, and steps S439 and S441 may be removed from the processing flow. This process is effective for a management policy where the operator confirms the print flags and manually selects calibration targets.

In step S424 as the image acquisition process, the target flag of the detected marker may be set to be 1. Such process is effective for a policy where the detected marker is also set as a calibration target.

Also, in step S424 as the image acquisition process, the print flag of the detected marker may be set to be 1. This process is effective for a policy where all the detected markers are determined as printed markers allocated on the space.

Furthermore, in step S424 as the image acquisition process, both the target flag and print flag of the detected marker may be set to be 1. Such process is effective for a policy where all the detected markers are determined as printed markers allocated on the space, and the printed markers are set as calibration targets.

Also, the number of marker IDs to be input to the field 510 on the window shown in FIG. 27 is not limited to one. For example, a plurality of marker IDs delimited by commas or a marker ID range specified by coupling marker IDs via a hyphen may be input. In this way, a load on the operations of the operator can be reduced.

Processing for automatically repeating creation of new marker definition information and printing of markers by the number of times designated by the operator may be added. With this processing, when a large number of new markers are printed and used, a load on the operations of the operator can be reduced.

In this embodiment, markers are managed using only two states, i.e., "printed" or "not printed". Also, the number of times and time period of printing may be added to the marker definition information, and the processes may be changed depending on the print log. For example, it is determined that a marker which has been printed a plurality of times is more likely to overlap another marker, and such marker may be excluded from the marker calibration targets.

The aforementioned modifications may be combined, needless to say.

For example, the process for setting the print flag of the detected marker to be 1 upon image acquisition, and the process for automatically printing markers with marker IDs which are not included in the marker definition table by a designated number may be combined.

Upon execution of such processes, the following management can be made. That is, before the marker IDs to be used are determined and corresponding markers are printed, images of all markers allocated on the physical space are acquired and are excluded from the markers to be printed. Then, new markers as many as the designated number other than the excluded markers are automatically generated.

Such processes are effective when a plurality of systems that perform calibration and registration processing are used in neighboring spaces, and overlapping markers are inhibited from being used (markers are exclusively used).

The aforementioned modifications may be selected and set in advance according to operator's favor.

Fifth Embodiment

In the first to fourth embodiments, all markers included in an image are treated equally. However, the present invention is not limited to this. For example, how reliable is each marker in the image as data for calibration may be calculated as a reliability, and calibration targets and processes may be changed (by evaluating markers) in accordance with the reliabilities.

As examples of the marker reliabilities, (1) the frequency of occurrence of an index in an acquired image group, (2) an angle an index makes with the image capturing device in the acquired image, (3) the area of an index on the acquired image, (4) the contrast of the acquired image, (5) the position of an index on the acquired image,
and combinations of them may be used.

(1) is used for a policy where it is determined that a marker which has an extremely small frequency of occurrence has a low reliability since such marker is considered as noise as a recognition error of an object other than a marker.

(2) is used for a policy where it is determined that a marker with a small angle has a low reliability since the position and orientation calculation precision of a marker becomes lower with decreasing angle.

(3) is used for a policy where it is determined that a marker (index) with a small area on the image has a low reliability since the position and orientation calculation precision of a marker becomes lower with decreasing area.

(4) is used for a policy where it is determined that a marker detected from a low-contrast image has a low reliability since the marker detection error from the image becomes larger with decreasing contrast.

(5) is used for a policy where it is determined that a marker (index) located at the edge of an image has a low reliability since a marker which is located at a position closer to the edge of the image is readily susceptible to an optical distortion of the image capturing device.

Note that the reliability may be determined by combining the aforementioned examples. The selection conditions of markers serving as calibration targets and registration processing targets are not limited to the aforementioned conditions, and all pieces of collateral information associated with a marker can be used.

According to each of the aforementioned embodiments, the following effects can be expected. That is, a series of operations for excluding an arbitrary marker or overlapping marker from the calibration and registration processing, or adding a marker to the processing again can be facilitated. Images of all markers other than those to be excluded need not be captured again, and markers to be excluded need not be removed from the space. Hence, the man-hour the setting operations required for the calibration and registration processing can be reduced.

As the selection method, since both the manual method by the operator and the semi-automatic method based on the marker definition information held by the image processing apparatus are combined, a flexible and convenient method can be provided.

Furthermore, in addition to the above selection method, since the image processing apparatus notifies the operator of operations required to execute the calibration according to the marker definition information, a load on the setting operations by the operator can be reduced.

Sixth Embodiment

In each of the above embodiments, a marker is used as an example of an index. However, an index used in registration is not limited to a marker. For example, natural features may be used.

Figure 31:
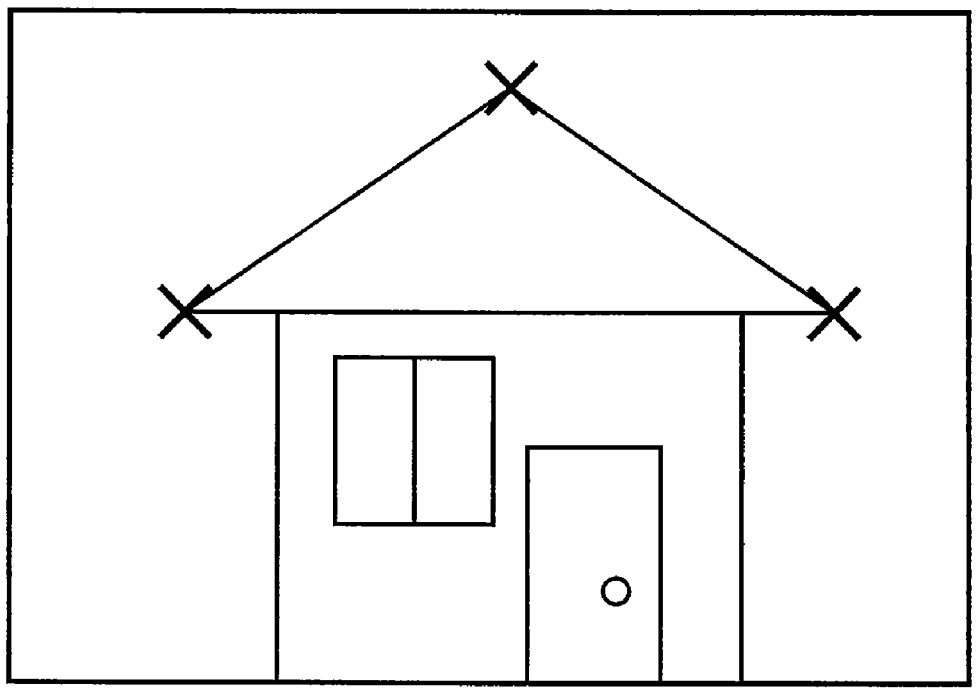
FIG. 31 shows an example of an image obtained when a house as a physical object is captured.

FIG. 31 shows an example of an image obtained when an image of a house as a physical object is captured. For example, when the image of the physical space is captured, as shown in FIG. 31, corners (three corners indicated by "x" in FIG. 31) in the image or the like can be used as natural features (feature points). In addition, SIFT features in the image may be used as feature points.

When using natural features, as an application of the second and third embodiments, when it is determined that many similar natural features exist on the physical image (the number of such features is larger than a predetermined value), an overlapping flag for that natural feature is set to be "1". That feature point is excluded from the calibration and registration processing.

Figure 32A:
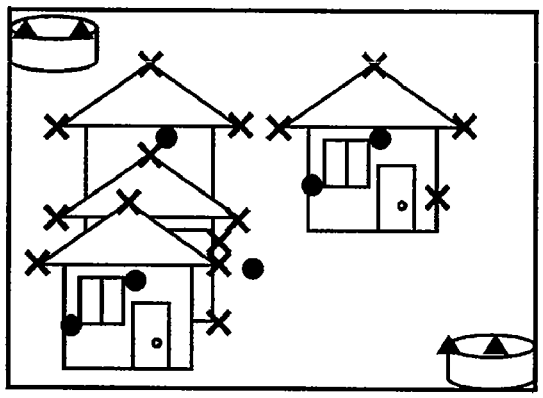
FIG. 32A shows an example of an image obtained by capturing a physical space when many similar natural features exist on that physical space.
Figure 32B:
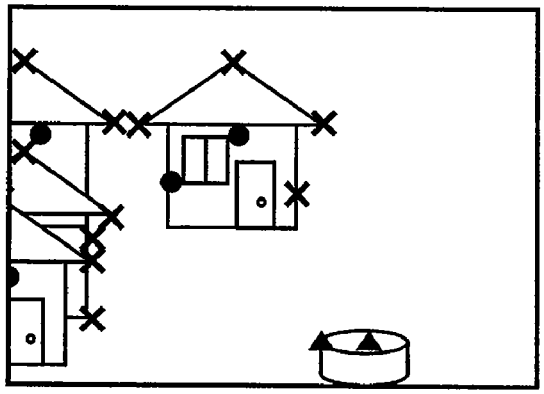
FIG. 32B shows an example of an image obtained by capturing a physical space when many similar natural features exist on that physical space.
Figure 32C:
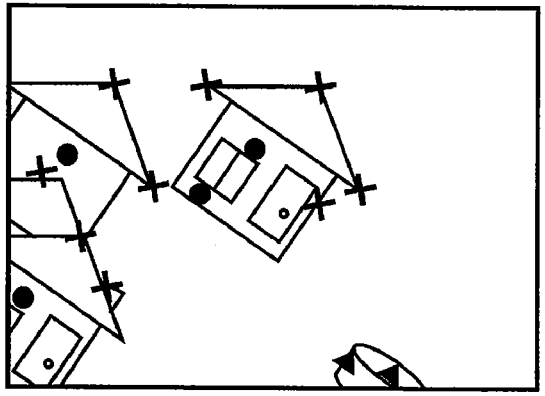
FIG. 32C shows an example of an image obtained by capturing a physical space when many similar natural features exist on that physical space.

FIGS. 32A to 32C show examples of images obtained when many similar natural features exist on the physical space, and an image of this physical space is captured. In the images shown in FIGS. 32A to 32C, natural features expressed by x occur frequently, and the overlapping flags of these natural features are set to be "1" to exclude these natural features.

Figure 33A:
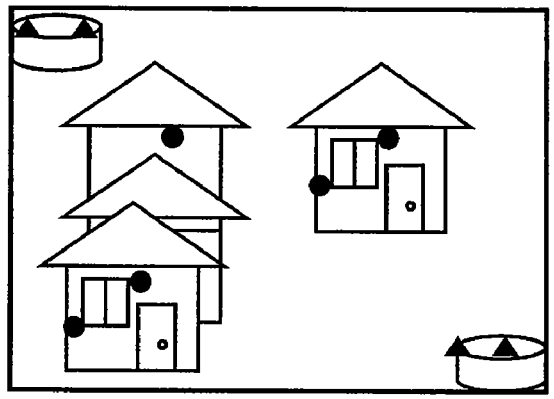
FIG. 33A shows an image obtained when natural features set with an overlapping flag="1" are excluded from those shown in FIG. 32A.
Figure 33B:
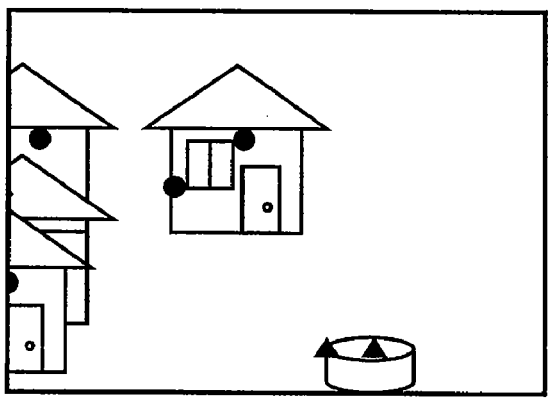
FIG. 33B shows an image obtained when natural features set with an overlapping flag="1" are excluded from those shown in FIG. 32B.
Figure 33C:
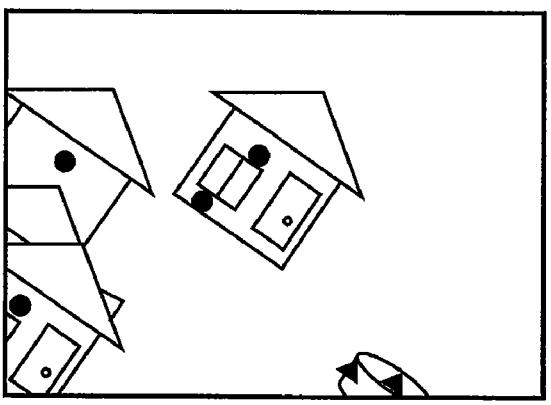
FIG. 33C shows an image obtained when natural features set with an overlapping flag="1" are excluded from those shown in FIG. 32C.

FIGS. 33A to 33C show images when the natural features set with the overlapping flag="1" are excluded from those shown in FIGS. 32A to 32C.

In this way, the calibration and registration processing can be executed for natural features obtained by excluding similar ones.

As an application of the fifth embodiment, the number of similar features may be used as a reliability. For example, 1/(the number of similar features) may be calculated in association with all features included per image or those included in all images, and that value may be used as the reliability. In this case, if the value assumes "1", the highest reliability is determined, and as the value becomes closer to "0", a lower reliability is determined. A threshold for the reliability is set, and a feature whose reliability is lower than the set threshold is excluded from the calibration and registration processing.

Other Embodiments

The objects of the present invention can be achieved as follows. That is, a recording medium (or storage medium), which records a program code of software that can implement the functions of the above-mentioned embodiments is supplied to a system or apparatus. A computer (or a CPU or MPU) of the system or apparatus reads out and executes the program code stored in the recording medium. In this case, the program code itself read out from the recording medium implements the functions of the above-mentioned embodiments, and the recording medium which records the program code constitutes the present invention.

When the computer executes the readout program code, an operating system (OS) or the like running on the computer performs some or all of actual processing operations based on an instruction of the program code. The present invention also includes a case wherein the functions of the above-mentioned embodiments are implemented by this processing.

Furthermore, assume that the program code read out from the recording medium is written in a memory of a function expansion card or a function expansion unit, which is inserted in or connected to the computer. After that, the functions of the above-mentioned embodiments are implemented by some or all of actual processing operations executed by a CPU or the like arranged in the function expansion card or function expansion unit based on an instruction of the program code. Such case is also included in the present invention.

When the present invention is applied to the recording medium, that recording medium stores program codes corresponding to the aforementioned flowchart.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-220638 filed Aug. 11, 2006, and Japanese Patent Application No. 2007-38430 filed Feb. 17, 2007, which are hereby incorporated by reference herein in their entirety.

What is claimed is:

1. An image processing method comprising:
an acquisition step of acquiring an image of a physical space on which a plurality of markers are arranged, wherein said markers have respective patterns;
a recognition step of recognizing the patterns of the markers in the image acquired in the acquisition step;
a detection step of detecting duplicated patterns appeared more than once in the recognized patterns of the markers recognized in the recognition step; and
a calculation step of calculating a position and orientation, on the physical space, of the marker having the recognized pattern except for the duplicated patterns detected in the detection step.

2. The method according to claim 1, further comprising:
a setting step of setting an information indicating whether the marker is used as a calculation target or an illegible calculation target in the calculation step, based on a user instruction, and
wherein, the calculation step includes a step of calculating a position and orientation of the index except for an marker indicated as the illegible calculation target in the information set in the setting step.

3. The method according to claim 1, wherein:
the acquisition step includes a step of acquiring a plurality of images of a physical space on which a plurality of markers are arranged;
the recognition step includes a step of recognizes the patterns of markers in the plurality of images acquired in the acquisition step;
the method further comprising:
a selection step of selecting an exclusion image from the plurality of the images based on a user instruction; and
wherein, in the calculation step, calculating a position and orientation of the marker except for an index having a pattern of a marker including in the exclusion image selected in the selection step.

4. The method according to claim 1, further comprising:
a recording step of recording markers having a pattern printed,
wherein, the calculation step includes a step of calculating a position and orientation, on the physical space, of the marker having the recognized pattern or the index recorded in the recording step.

5. The method according to claim 1, further comprising:
an evaluation step of evaluating reliabilities for the markers having the pattern recognized in the recognition step,
wherein, the calculation step includes a step of calculating a position and orientation, on the physical space, of a marker which is determined based on an evaluation result in the evaluation step.

6. The method according to claim 5, wherein, the evaluation step includes a step of evaluating the reliability of a marker using one of a frequency of occurrence of the marker in images acquired in the acquisition step, an angle the marker makes with the image, an area of the marker in the image, a position of the marker in the image, and a contrast between the marker and a remaining part in the image.

7. The method according to claim 1, wherein the patterns of the markers are based on a predetermined format.

8. The method according to claim 1, wherein the patterns of the markers comprise a natural feature which exists on the physical space in advance.

9. An image processing apparatus comprising:
an acquisition hardware unit adapted to acquire an image of a physical space on which a plurality of markers are arranged, wherein said markers have respective patterns;
a recognition hardware unit adapted to recognize the patterns of the markers in the image acquired by said acquisition hardware unit;
a detection hardware unit adapted to detect duplicated patterns appeared more than once in the recognized patterns of the markers recognized by the recognition hardware unit; and
a calculation hardware unit adapted to calculate a position and orientation, on the physical space, of the marker having the recognized pattern except for the duplicated patterns detected by the detection hardware unit.

10. A non-transitory computer-readable storage medium for storing a computer program for making a computer execute an image processing method according to claim 1.

* * * * *